(12) United States Patent
Miyazono

(10) Patent No.: US 6,823,914 B2
(45) Date of Patent: Nov. 30, 2004

(54) HEAVY DUTY PNEUMATIC RADIAL TIRES WITH ORGANIC FIBER CORD BEAD REINFORCING LAYER

(75) Inventor: Toshiya Miyazono, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/340,658

(22) Filed: Jan. 13, 2003

(65) Prior Publication Data

US 2003/0102068 A1 Jun. 5, 2003

Related U.S. Application Data

(62) Division of application No. 09/840,256, filed on Apr. 24, 2001, now Pat. No. 6,543,503, which is a division of application No. 09/242,303, filed as application No. PCT/JP98/02451 on Jun. 3, 1998, now Pat. No. 6,260,597.

(30) Foreign Application Priority Data

Jun. 13, 1997 (JP) .............................................. 9-156460

(51) Int. Cl.[7] .......................... B60C 15/00; B60C 15/06
(52) U.S. Cl. ........................................ 152/543; 152/539
(58) Field of Search ................................. 152/543, 539

(56) References Cited

U.S. PATENT DOCUMENTS

| 3,921,693 A | 11/1975 | Suzuki et al. |
| 4,185,677 A | 1/1980 | Motomura et al. |
| 4,471,828 A | 9/1984 | Kishida et al. |
| 4,510,984 A | 4/1985 | Kishida et al. |

FOREIGN PATENT DOCUMENTS

| EP | 0 317 488 A2 | 5/1989 |
| GB | 2 035 228 A | 6/1980 |
| GB | 2 127 361 A | 4/1984 |
| JP | 53-8404 B2 | 3/1978 |
| JP | 57-4531 B2 | 1/1982 |
| JP | 61-211107 A | 9/1986 |
| JP | 3-227705 A | 10/1991 |
| JP | 4-189607 A | 7/1992 |
| JP | 5-178039 A | 7/1993 |
| JP | 8-150813 A | 6/1996 |
| JP | 9-24713 A | 1/1997 |

Primary Examiner—Adrienne C. Johnstone
(74) Attorney, Agent, or Firm—Sughrue Mion, PLLC

(57) ABSTRACT

A tire wherein one or more rubberized organic fiber cord layers extending over an end of a carcass turnup portion in a radial direction of the tire are arranged so as to extend from a position near to an outside of the bead core over the end of the turnup portion toward the outside of the tire and spread apart to the turnup portion. A tire wherein one or more rubberized organic fiber cord layers are arranged so as to extend from a position extending over an end of a bead portion reinforcing layer made of a steel cord layer toward the outside of the tire extending over the end of the turnup portion in the radial direction of the tire and spread apart to the reinforcing layer. And also, a tire wherein a cord layer portion of one or more rubberized organic fiber cord layers extending over the end of the turnup portion in the radial direction of the tire and outside the turnup portion has a first bent portion bending toward the inside of the tire.

5 Claims, 19 Drawing Sheets

FIG_3

FIG_8

FIG_16
PRIOR ART

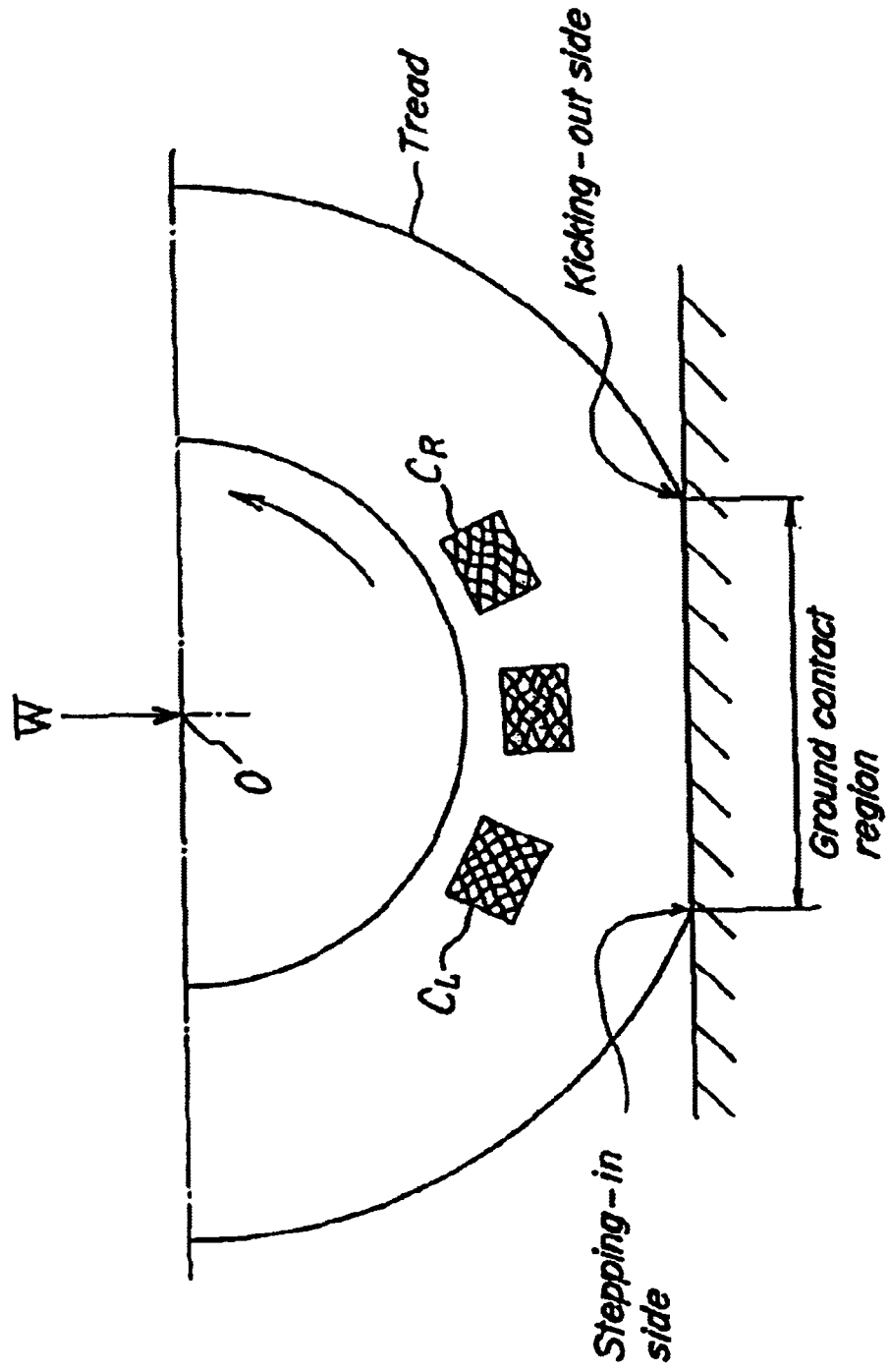

HEAVY DUTY PNEUMATIC RADIAL TIRES WITH ORGANIC FIBER CORD BEAD REINFORCING LAYER

This is a division of application Ser. No. 09/840,256 filed Apr. 24, 2001, now U.S. Pat. No. 6,543,503, which is a division of application Ser. No. 09/242,303 filed Feb. 12, 1999, now U.S. Pat. No. 6,260,597, which is a National Stage entry under 37 C.F.R. §371 based on International Patent Application No. PCT/JP98/02451 filed Jun. 3, 1998; the entire disclosures of all of the above-noted applications are incorporated herein by reference.

TECHNICAL FIELD

This invention relates to a heavy duty pneumatic radial tire, and more particularly to tires suitable for use in vehicles such as trucks, buses and the like, and particularly it relates to a heavy duty pneumatic radial tire in which an organic fiber cord layer is used in a bead portion of the tire used under severe conditions of load, running speed and the like as a reinforcing layer effective for the bead portion to improve a bead portion durability.

BACKGROUND ART

In the heavy duty pneumatic radial tire suitable for use in trucks, buses and the like, it is common to reuse a base tire for recapping when a tread rubber reaches a service limit in the wear because it is not desirable to use a new tire only once. Referring to FIG. 16, illustrating a section of a main part of the conventional tire inclusive of a bead portion, there is often observed a case of causing a long and large crack or a separation failure accompanied with the growth of the crack in an end 4te of a turnup portion 4t of a carcass 4 or an outer end 6e of a rubberized steel cord layer (generally called a wire chafer) 6 as a reinforcing layer for a bead portion 1 among members constituting the bead portion 1. The used tire having such defects is unsuitable as a base tire and it is obliged to give up recapping thereof. When the service conditions are very severe, the aforementioned crack or separation failure is caused even in the new tire on the way of the service life.

The aforementioned long crack or separation failure in an end portion such as end 4te, end 6e or the like results from the concentration of large strain in such end portion. Referring to FIG. 17 showing a section of another conventional tire, in order to eliminate this strain, there is widely used means where one or more organic fiber cord layers, two layers in the illustrated embodiment, for example, nylon cord layer 15 (15-1, 15-2) generally called a nylon chafer are arranged outside the turnup portion 4t of the carcass 4 alone in case of FIG. 16 or together with the steel cord layer 6 as the reinforcing layer in the case of FIG. 18 and adjacent thereto at a height sufficiently covering the above end portion in a radial direction of the tire.

However, the application or addition of the organic fiber cord layer 15 does not develop an effect to an intended extent and reasons thereof are investigated to elucidate the following facts.

That is, as a part of the two organic fiber cord layers 15-1, 15-2 (see FIG. 17, FIG. 18) is perspectively shown in FIG. 19 showing a half lower-side of a tire running under loading at a zone ranging from a leading edge of a contact patch to a trailing edge thereof, cords $C_R$ (upward to the right in the figure) and cords $C_L$ (upward to the left in the figure) of the organic fiber cord layers 15-1, 15-2 are arranged so as to cross with each other between the layers in a bead portion 1 corresponding to a ground contact region of the tire tread rotating under a given air pressure and under loading, so that even in either case of arrangements upward to the left and the right, the cords have to be always subjected to compression deformation at the leading side or the trailing edge of the contact patch.

Although detailed reasons of always causing the compression deformation will be described later, the degree of compression deformation becomes higher when the traction force and braking force are further applied to the tire. When an axial compression force is applied to the cord in the organic fiber cord layer 15, the modulus of the organic fiber cord becomes very low to the axial compression, so that the rigidity required for developing a stress mitigating function of the organic fiber cord layer 15 naturally intended to the turnup end 4te of the carcass 4 or the end 6e of the reinforcing layer 6 is largely diminished. According to experiments, a ratio of axial compression modulus to tensile modulus in the organic fiber cord layer embedded in rubber is only about 0.1.

And also, it has been confirmed that cracking failure is caused in an end portion of the organic fiber cord layer 15 toward the outside of the tire. As a result of an investigation on the cause of the cracking failure, it is elucidated to be caused by a large tensile strain applied to rubber in the vicinity of the end 15e of the organic fiber cord layer 15 toward the outside of the tire. That is, air pressure filled in the heavy duty pneumatic radial tire mainly used in truck and bus is as high as 7.00~9.00 kgf/cm$^2$, for example, at room temperature and is further increased by a rising of tire temperature accompanied with the running of the vehicle. As shown in FIG. 18, a large tension T is applied to the carcass 4 by a higher internal pressure, and the large tension T produces pulling forces a, b of arrow direction in not only the turnup portion 4t of the carcass 4, but also the bead portion reinforcing layer 6 and the organic fiber cord layer 15 and hence the turnup portion 4t, bead portion reinforcing layer 6 and organic fiber cord layer 15 are forcibly displaced in the acting direction of the pulling forces a, b. Such a forced displacement particularly causes a large tensile strain e in rubber near to the end 15e of the organic fiber cord layer 15. The tensile strain e is further increased by bending deformation of the bead portion 1 under loading shown by a phantom line. Consequently, a fatigue crack is created in rubber near to the end 15e of the organic fiber cord layer 15 by repetitive action of strain amplitude of the tensile strain e accompanied with the rotation under loading, which grows to finally cause the separation failure.

In addition, it is strongly demanded to form a lower section profile of radial ply tires for recent trucks and buses, from which it tends to increase low-section tires. In the low-section tire used under heavy load, the deformation of the bead portion 1 is particularly increased and the strain amplitude quantity of the tensile strain e is considerably increased, so that there is high-lighted cracking failure or separation failure in the end 15e of the organic fiber cord layer 15 located toward the outside of the tire, which has hardly been observed in the conventional tire. This type of the failure is a recent tendency and an effective improving countermeasure does not exist at the present time.

It is, therefore, an object of the invention to provide a heavy duty pneumatic radial tire in which the organic fiber cord layer advantageously develops the rigidity as a stress mitigating layer to the end of the turnup portion of the carcass and the end of the bead portion reinforcing layer made of the steel cord layer extending over the turnup end outward in the radial direction of the tire and also the resistance to cracking in the end of the organic fiber cord layer is largely improved even in a tire having a small aspect ratio to considerably improve the bead portion durability and recapping property as compared with the conventional tire.

SUMMARY OF THE INVENTION

In order to achieve the above object, a first aspect of the invention lies in a heavy duty pneumatic radial tire comprising a carcass of at least one rubberized cord ply of radial arrangement toroidally extending between a pair of bead core embedded in bead portions and wound around the bead core from inside of the tire toward outside to form a turnup portion, and at least one rubberized organic fiber cord layer extending outside the turnup portion over an end of the turnup portion outward in a radial direction of the tire, in which the organic fiber cord layer is arranged so as to extend from a position near to an outside of the bead core over the end of the turnup portion toward the outside of the tire and spread apart to the turnup portion.

In a preferable embodiment of the first aspect of the invention, the organic fiber cord layer has a first bent portion acutely bending toward the outside of the tire with respect to a winding direction of the turnup portion extending outward from the position near to the outside of the bead core in the radial direction, and a bending angle α of the first bent portion with respect to the winding direction of the turnup portion at a radial section of the tire is within a range of 15~60°.

In another preferable embodiment of the first aspect of the invention, a bead portion reinforcing layer made of a rubberized steel cord layer is disposed between the turnup portion of the carcass and the organic fiber cord layer and an outer end of the reinforcing layer in the radial direction of the tire locates inward from the end of the turnup portion in the radial direction of the tire.

In the other preferable embodiment of the first aspect of the inv$ention, an end of the first bent portion of the organic fiber cord layer is an outermost end in the radial direction of the tire.

In a still further preferable embodiment of the first aspect of the invention, the organic fiber cord layer has the first bent portion and a second bent portion again bending from an end of the first bent portion toward an inside of the tire, and an inclination angle β of the second bent portion inclined with respect to the winding direction of the turnup portion is within a range of 15~60° at the radial section of the tire.

In a further preferable embodiment of the first aspect of the invention, the organic fiber cord layer has the first bent portion, the second bent portion and a third bent portion extending outward from an end of the second bent portion at an approximately equal distance to an outer surface of the tire in the radial direction of the tire.

In another preferable embodiment of the first aspect of the invention, the organic fiber cord layer has the first bent portion and the third bent portion extending outward from the end of the first bent portion at an approximately equal distance to an outer surface of the tire in the radial direction of the tire.

In the other preferable embodiment of the first aspect of the invention, the organic fiber cord layer has the first bent portion, the third bent portion and a fourth bent portion extending from the third bent portion toward the inside of the tire and acutely inclining with respect to the winding direction of the turnup portion.

The inclination angle γ of the fourth bent portion with respect to the winding direction of the turnup portion is within a range of 15~60° at the section of the tire.

In order to achieve the above object, a second aspect of the invention lies in a heavy duty pneumatic radial tire comprising a carcass of at least one rubberized cord ply of radial arrangement toroidally extending between a pair of bead cores embedded in bead portions and wound around the bead core from inside of the tire toward outside to form a turnup portion, at least one bead portion reinforcing layer made of a rubberized steel cord layer extending outside the turnup portion over an end of the turnup portion outward in a radial direction of the tire, in which the organic fiber cord layer is arranged so as to extend from a position near to an outside of the bead core over the end of the bead portion reinforcing layer toward the outside of the tire and spread apart from the bead portion reinforcing layer.

In a preferable embodiment of the second aspect of the invention, the organic fiber cord layer has a first bent portion acutely bending toward the outside of the tire with respect to the bead portion reinforcing layer extending outward from the position near to the outside of the bead core in the radial direction and the extending direction of the bead portion reinforcing layer, and a bending angle α of the first bent portion with respect to the extending direction of the bead portion reinforcing layer at α radial section of the tire is within a range of 15~60°.

In another preferable embodiment of the second aspect of the invention, an end of the first bent portion of the organic fiber cord layer is an outermost end in the radial direction of the tire.

In the other preferable embodiment of the second aspect of the invention, the organic fiber cord layer has the first bent portion and a second bent portion again bending from an end of the first bent portion toward an inside of the tire, and an inclination angle β of the second bent portion inclined with respect to the extending direction of the bead portion reinforcing layer is within a range of 15–60° at the radial section of the tire.

In a further preferable embodiment of the second aspect of the invention, the organic fiber cord layer has the first bent portion, the second bent portion and a third bent portion extending outward from an end of the second bent portion at an approximately equal distance to an outer surface of the tire in the radial direction of the tire.

In another preferable embodiment of the second aspect of the invention, the organic fiber cord layer has the first bent portion and the third bent portion extending outward from the end of the first bent portion at an approximately equal distance to an outer surface of the tire in the radial direction of the tire.

In the other preferable embodiment of the second aspect of the invention, the organic fiber cord layer has the first bent portion, the third bent portion and a fourth bent portion extending from the third bent portion toward the inside of the tire and acutely inclining with respect to the extending direction of the bead portion reinforcing layer.

The inclination angle γ of the fourth bent portion with respect to the extending direction of the bead portion reinforcing layer is within a range of 15–60 at the section of the tire.

In order to achieve the above object, a third aspect of the invention lies in a heavy duty pneumatic radial tire comprising a carcass of at least one rubberized cord ply of radial arrangement toroidally extending between a pair of bead core embedded in bead portions and wound around the bead core from inside of the tire toward outside to form a turnup portion, and at least one rubberized organic fiber cord layer extending outside the turnup portion over an end of the turnup portion outward in a radial direction of the tire, in which at least a cord layer portion of the organic fiber cord layer located at the side of the turnup portion has a first bent portion bending such that its outer end is inclined toward an inside of the tire in a radial direction thereof.

In a preferable embodiment of the third aspect of the invention, a bending angle θ of the first bent portion with respect to the winding direction of the turnup portion is within a range of 15~70° at the section of the tire.

In another preferable embodiment of the third aspect of the invention, a bead portion reinforcing layer made of a rubberized steel cord layer is disposed between the turnup portion of the carcass and the organic fiber cord layer, and an outer end of the reinforcing layer in the radial direction of the tire locates inward from an end of the turnup portion in the radial direction of the tire.

In the other preferable embodiment of the third aspect of the invention, a bead portion reinforcing layer made of a rubberized steel cord layer is disposed between the turnup portion of the carcass and the organic fiber cord layer, and an outer end of the reinforcing layer in the radial direction of the tire locates between an end of the turnup portion and an outer end of at least the cord layer portion of the organic fiber cord layer located at the side of the turnup portion of the carcass, and the first bent portion located outward from the outer end of the bead portion reinforcing layer in the radial direction of the tire.

In a still further preferable embodiment of the third aspect of the invention, the end of the first bent portion of the organic fiber cord layer is an outermost end in the radial direction of the tire.

In the first, second and third aspects of the invention and their preferable embodiments, it is common that each length of the first bent portion, second bent portion and third bent portion of the organic fiber cord layer is within a range of 4~50 mm.

In the first, second and third aspects of the invention, the organic fiber cord layer is suitable to be a nylon cord layer.

BRIEF DESCRIPTION OF THE DRAWINGS

Embodiments for carrying out the invention will be described in detail with reference to FIG. 1~FIG. 15.

FIG. 19 is a side view of a portion of a tire illustrating loading in the ground contact zone.

DESCRIPTION OF THE PREFERRED EMBODIMENTS

The heavy duty pneumatic radial tire shown in FIG. 1~FIG. 15 (hereinafter referred to as a tire) is a tubeless tire (hereinafter referred to T/L tire) using a 15° drop center rim (15° DROP CENTER RIM or 15° DROP-CENTER RIM) defined in JATMA standard (1998 print) and ETRTO standard (1998 print) as an approved rim (term defined in JATMA standard, APPROVED RIM CONTOURS according to TRA standard, RECOMMENDED RIMS, PERMITTED RIMS according to ETRTO standard).

In FIG. 1~FIG. 15, the tire comprises a pair of bead portions 1 (shown only by one side), a sidewall portion 2 (shown only by one side) connecting thereto and a tread portion not shown according to custom, and is provided with a carcass 4 toroidally extending between a pair of bead cores 3 embedded in the bead portions 1. The carcass 4 is one or more radial cord plies, desirably rubberized steel cord plies of radial arrangement. Although omitted, the tire comprises a belt superimposed on an outer periphery of the carcass 4 and reinforcing the tread portion, desirably two or more rubberized steel cord cross layers.

Figure 15:
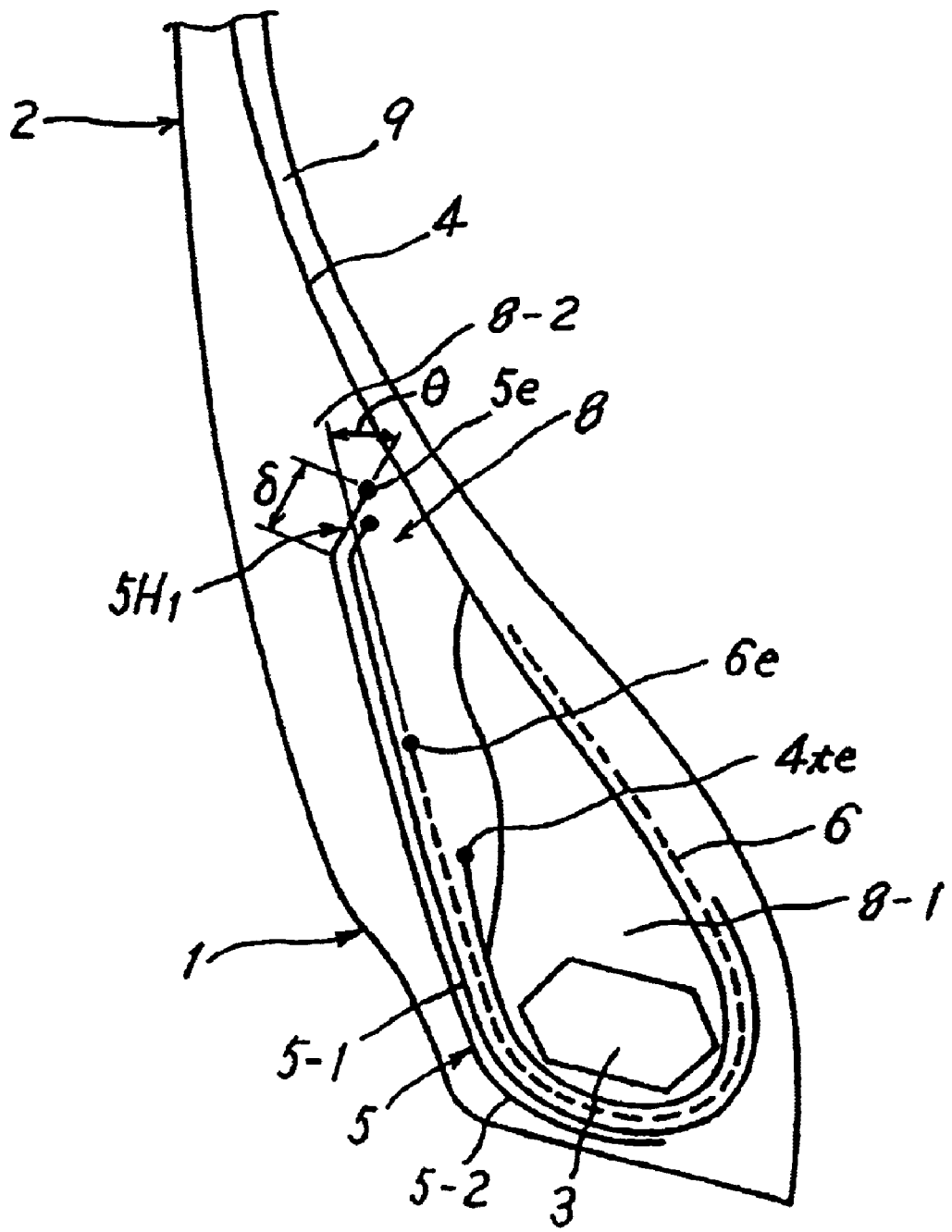
Figure 16:
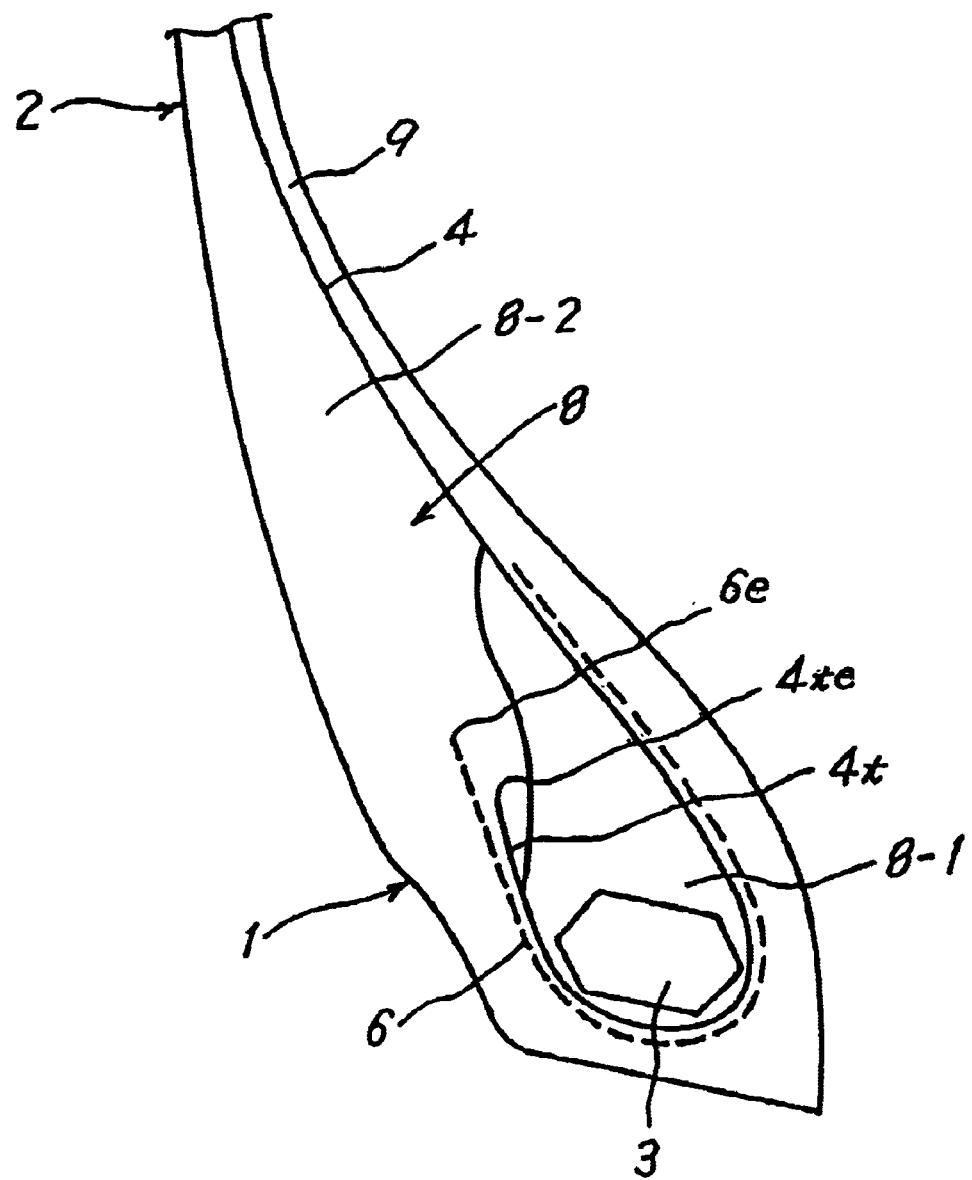
FIGS. 16~18 are diagrammatically sectional views of the portions of conventional tires.
Figure 17:
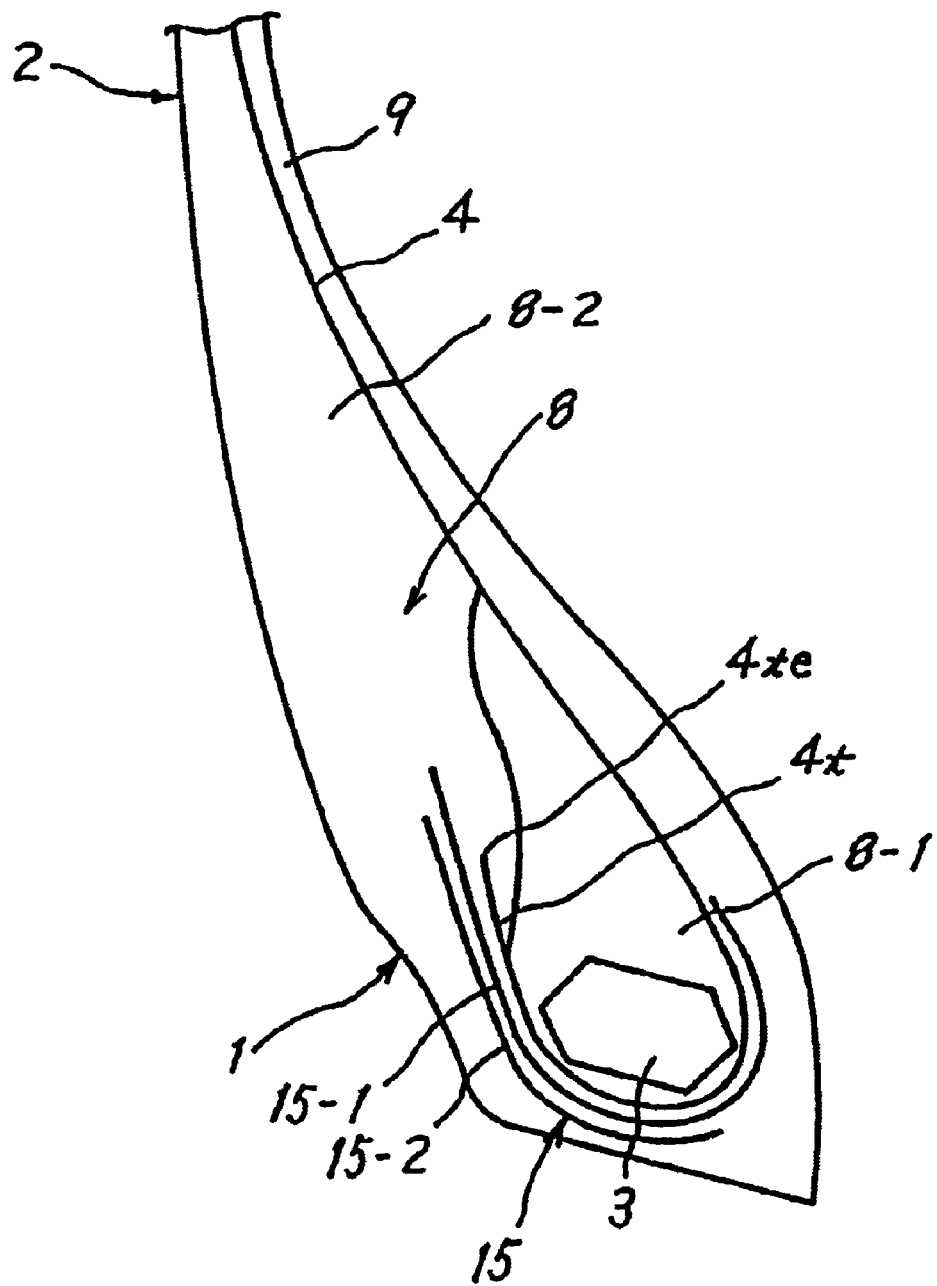

At least one ply of the carcass 4 has a turnup portion 4t wound around the bead core 3 from inside of the tire toward outside thereof. In the bead portion 1 is provided one or more rubberized organic fiber cord layers 5, preferably rubberized nylon cord layers (so-called nylon chafer) extending at an outside of the turnup portion 4t over an end 4te of the turnup portion outward in the radial direction of the tire (hereinafter referred to as outward in the radial direction), in which two organic fiber cord layers 5-1, 5-2 are shown in FIG. 1~FIG. 7, FIG. 8~FIG. 13 and FIG. 15 and one organic fiber cord layer 5 is shown in FIG. 8 and FIG. 15, respectively. Preferably, at least one layer of the organic fiber cord layers 5 (5-1, 5-2) is disposed up to the inside of the carcass 4 in the tire.

The tires according to the first aspect of the invention are explained in accordance with FIG. 1~FIG. 6. The bead portion 1 shown in FIG. 1~FIG. 4 has a structure having the organic fiber cord layers 5 arranged along the turnup portion 4t of the carcass 4, and the bead portion 1 shown in FIG. 5, FIG. 6 has a structure that the bead portion reinforcing layer 6 made of the rubberized steel cord layer 6 (shown by dotted lines) is arranged adjacent to the turnup portion 4t and an end 6e of the reinforcing layer 6 locates inward from an end 4te of the turnup portion 4t in the radial direction of the tire (hereinafter referred to as inward in the radial direction) and the organic fiber cord layers 5 are arranged outside the turnup portion 4t so as to sandwich the bead portion reinforcing layer 6 therebetween.

In the bead portion 1 shown in FIG. 1~FIG. 4, the organic fiber cord layers 5 are arranged directly adjacent to the outer surface of the turnup portion 4t inward from the position near to the outside of the bead core 3 in the bead portion 1 or inward from a position separated apart within a range of 2~20 mm inward from the end 4te of the turnup portion 4 in the actual T/L tire of the illustrated embodiments in the radial direction. In the bead portion 1 shown in FIG. 5 and FIG. 6, the organic fiber cord layers 5 are arranged close to the turnup portion 4t in a region adjacent to the bead portion reinforcing layer 6, and the organic fiber cord-layers 5 are arranged adjacent to the turnup portion 4t between the end 6e of the bead portion reinforcing layer 6 and the end 4te of the turnup portion 4.

As shown in FIG. 1~FIG. 6, the organic fiber cord layers 5 (5-1, 5-2) are arranged to extend from the position near to the outside of the bead core 3 or from the position separated apart within a range of the 2~20 mm inward from the end 4te of the turnup portion 4 in the T/L tire in the radial direction toward the outside of the tire and in a direction exceeding outward from the end 4te of the turnup portion 4t in the radial direction and to spread apart to the turnup portion 4t. When a distance between a start position of spreading the organic fiber cord layer 5 to the turnup portion 4t and the end 4te of the turnup portion 4 is short, the organic fiber cord layers 5 are arranged spread apart to the turnup portion 4t and the winding direction thereof. The winding direction is described below.

In FIG. 1~FIG. 6, the organic fiber cord layers 5 extend from the turnup portion 4t so as to spread apart thereto have concretely a first bent portion $5H_1$ acutely bending outward from the position near to the outside of the bead core 3 in the radial direction and toward the outside of the tire with respect to the turnup portion 4t and the winding direction thereof. More concretely, the bending angle $\alpha$ of the first bent portion $5H_1$ with respect to the turnup portion 4t and the winding direction thereof is within a range of 15~60°, preferably 20~40° at a section of the tire shown in each figure. The term "winding direction of the turnup portion 4t" used herein is defined by a tangent (hereinafter referred to as winding line) to a line (curved line or straight line or a composite curve of curved line and straight line) passing through a center of a thickness in an end portion inclusive of the end 4te of the turnup portion 4 at the section of the bead portion 1 or a portion ranging inward from the end 4te to a position separated apart therefrom within a range of 2~20 mm in the radial direction, which is the same as above below. The turnup portion 4t and the winding direction thereof includes both a case of inclining toward the outside of the tire outward in the radial direction and a case of extending in a direction perpendicular to a rotating axis of the tire outward in the radial direction and inclining toward the inside of the tire, which are the same as above below. As to the organic fiber cord layer 5 having the first bent portion $5H_1$, there are existent various examples as mentioned below.

Figure 1:
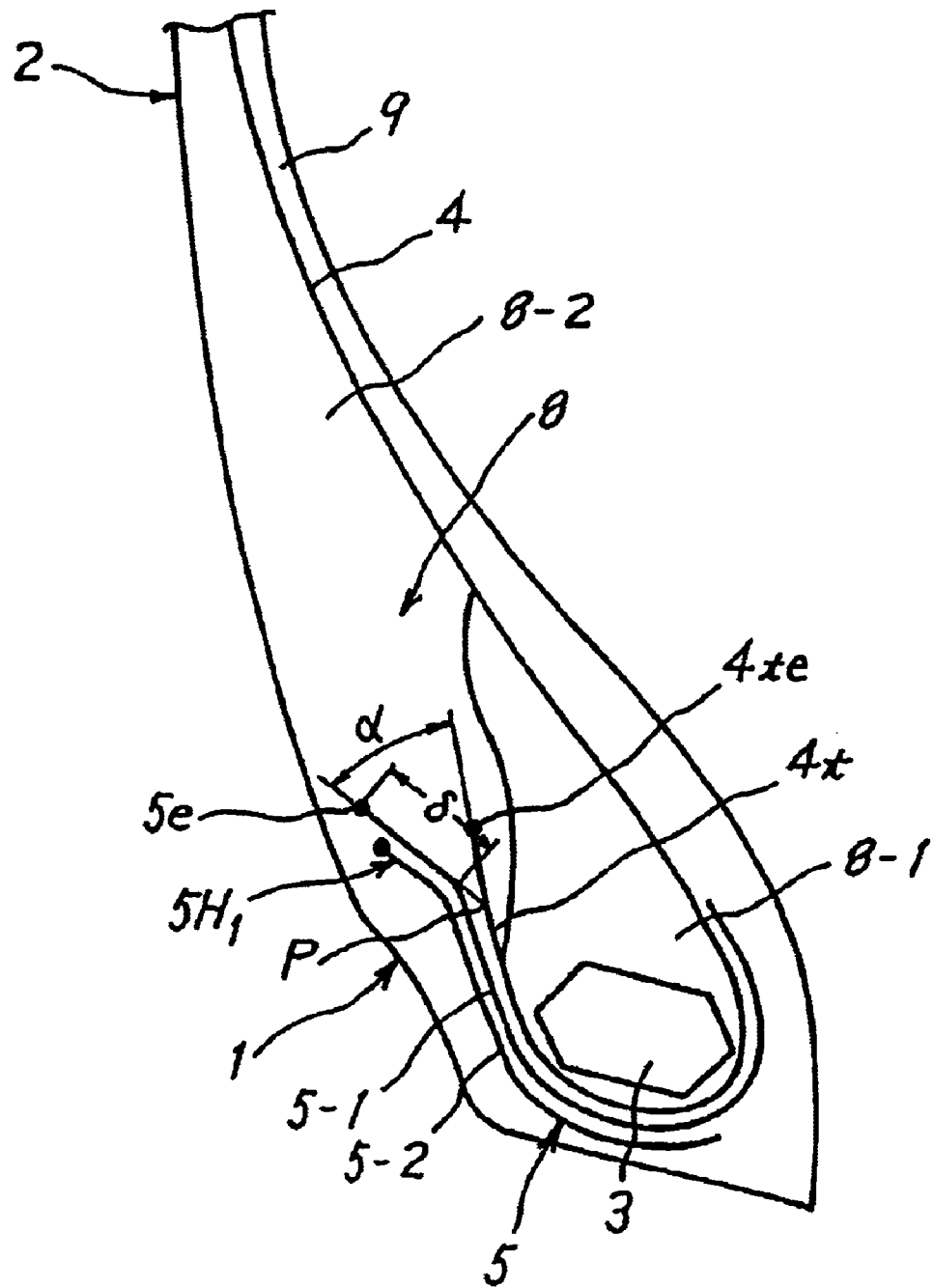
FIG. 1~FIG. 6 are diagrammatically sectional views of a main part inclusive of a bead portion at a section of a tire in a plane including a rotating axis of the heavy duty pneumatic radial tire according to the first aspect of the invention.

The organic fiber cord layer 5 shown in FIG. 1 is an example that the end 5e of the first bent portion $5H_1$ is an outermost end in the radial direction of the tire.

Figure 2:
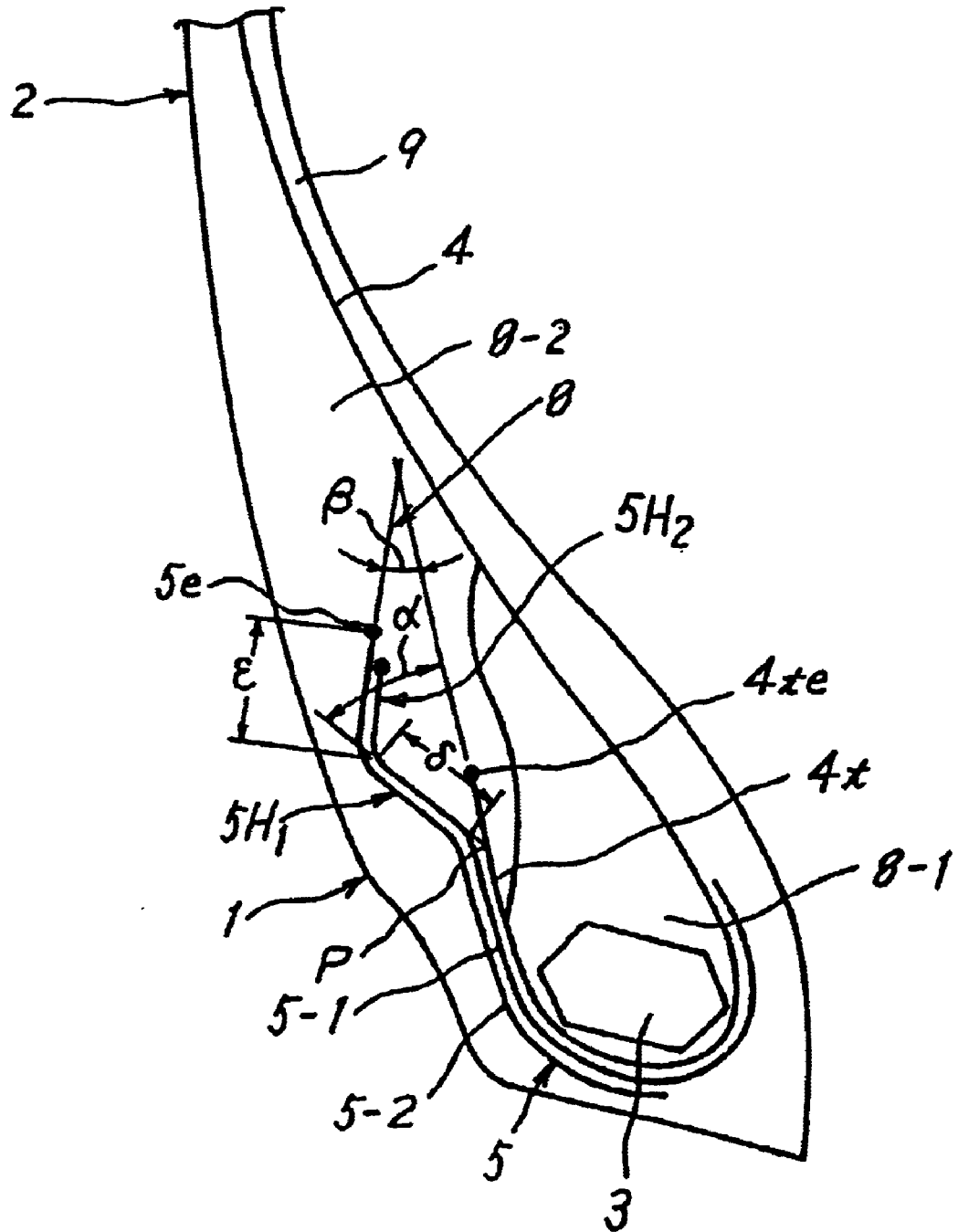

The organic fiber cord layer 5 shown in FIG. 2 is an example that the first bent portion $5H_1$ and a second bent portion $5H_2$ again bending toward the inside of the tire from an end at an outermost side position of the portion $5H_1$ are existent in a zone from the position near to the outside of the bead core 1 to the end 5e. As shown in FIG. 2, the second bent portion $5H_2$ is arranged so as to extend obliquely with respect to the winding direction of the turnup portion 4 and the inclination angle $\beta$ thereof is within a range of 15~60°, preferably 20~40°.

Figure 3:
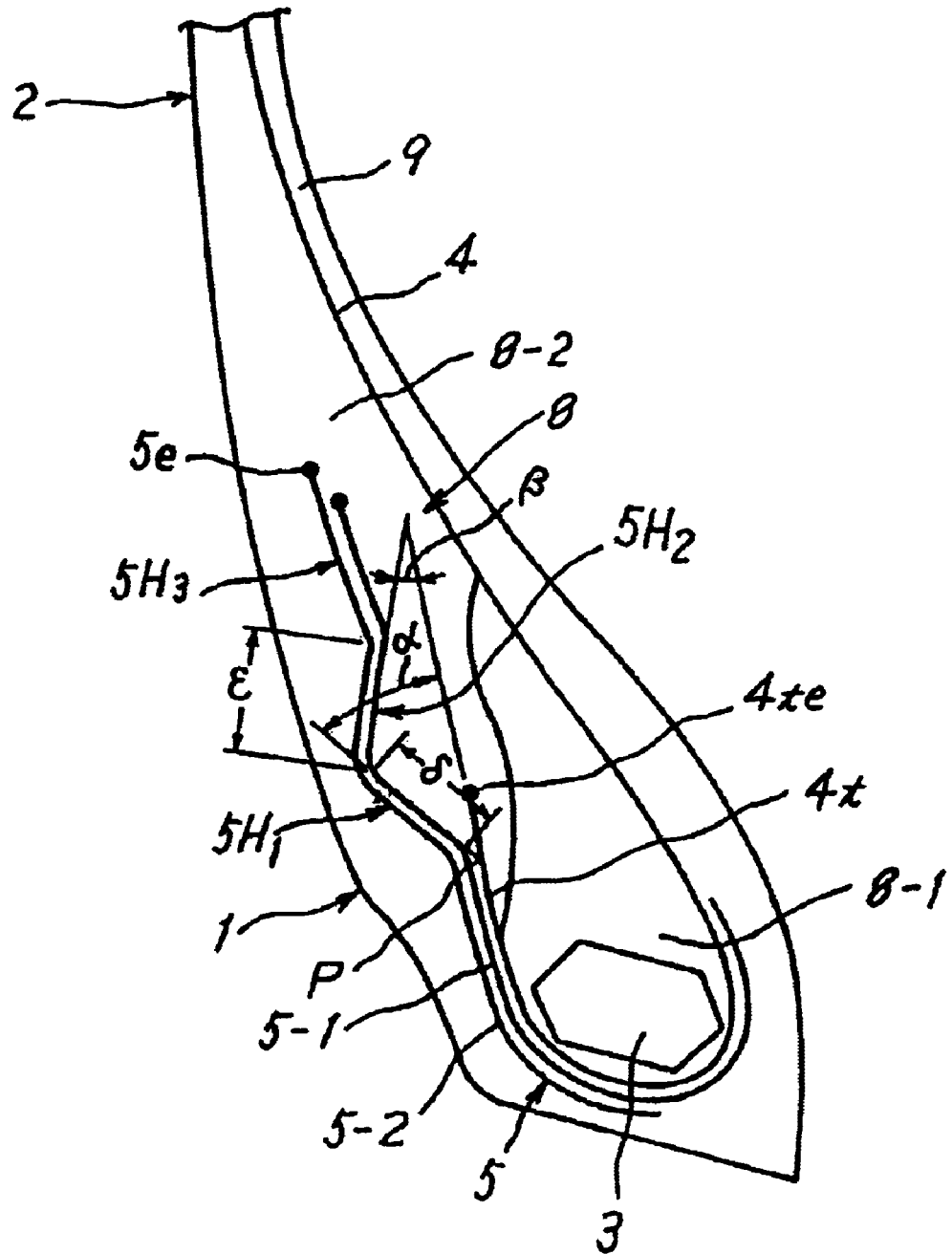

The organic fiber cord layer 5 shown in FIG. 3 is an example having the first bent portion $5H_1$, the second bent portion $5H_2$ and a third bent portion $5H_3$ extending outward from a bending end of the second bent portion $5H_2$ in the radial direction so as to maintain an approximately equal distance to the surface of the tire together, in which the third bent portion $5H_3$ has an end 5e.

Figure 4:
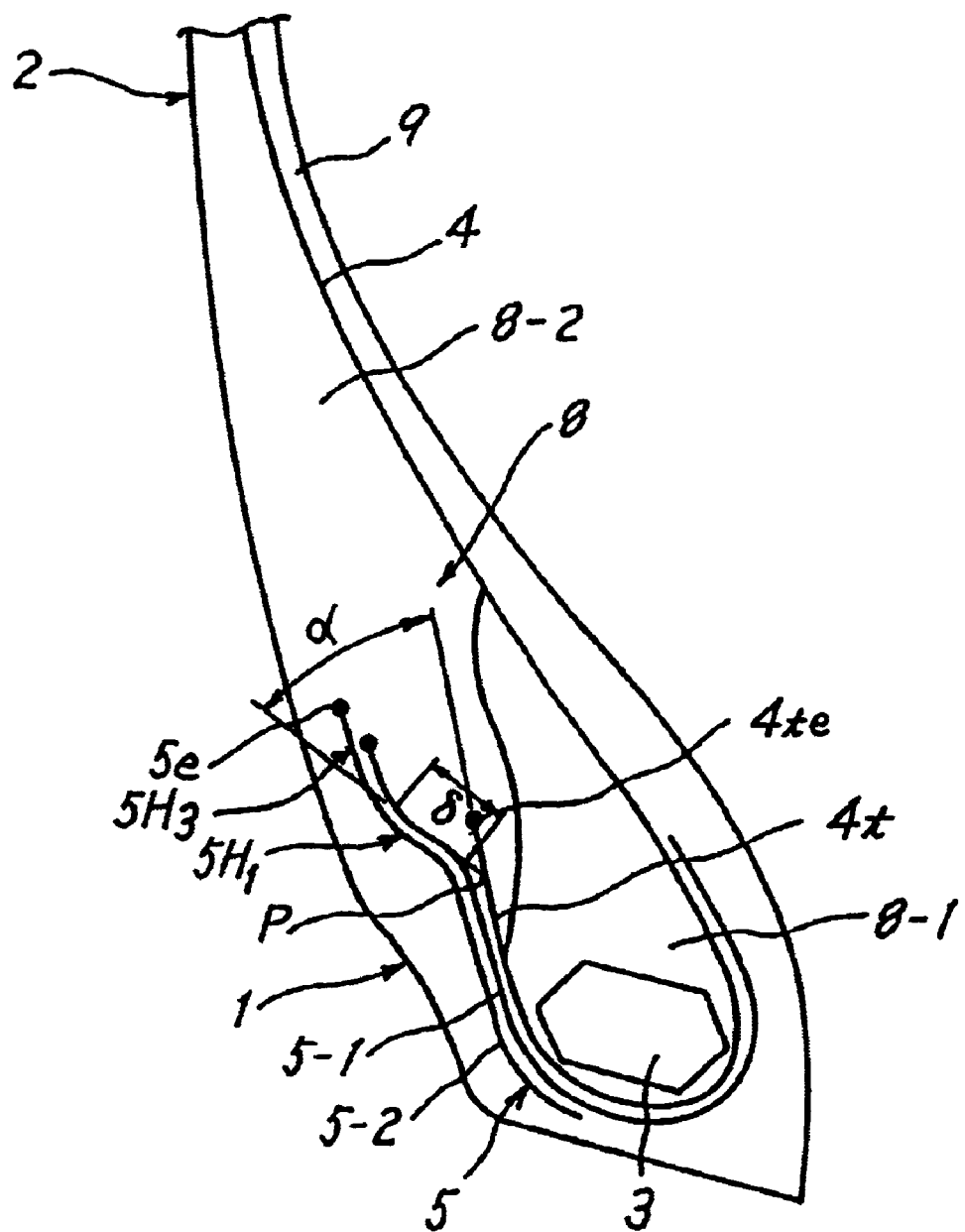

The organic fiber cord layer 5 shown in FIG. 4 is an example having the fist bent portion $5H_1$ and the third bent portion $5H_3$ extending outward from the bending end of the first bent portion $5H_1$ so as to maintain an approximately equal distance to the surface of the tire, in which the third bent portion $5H_3$ has an end 5e.

Figure 5:
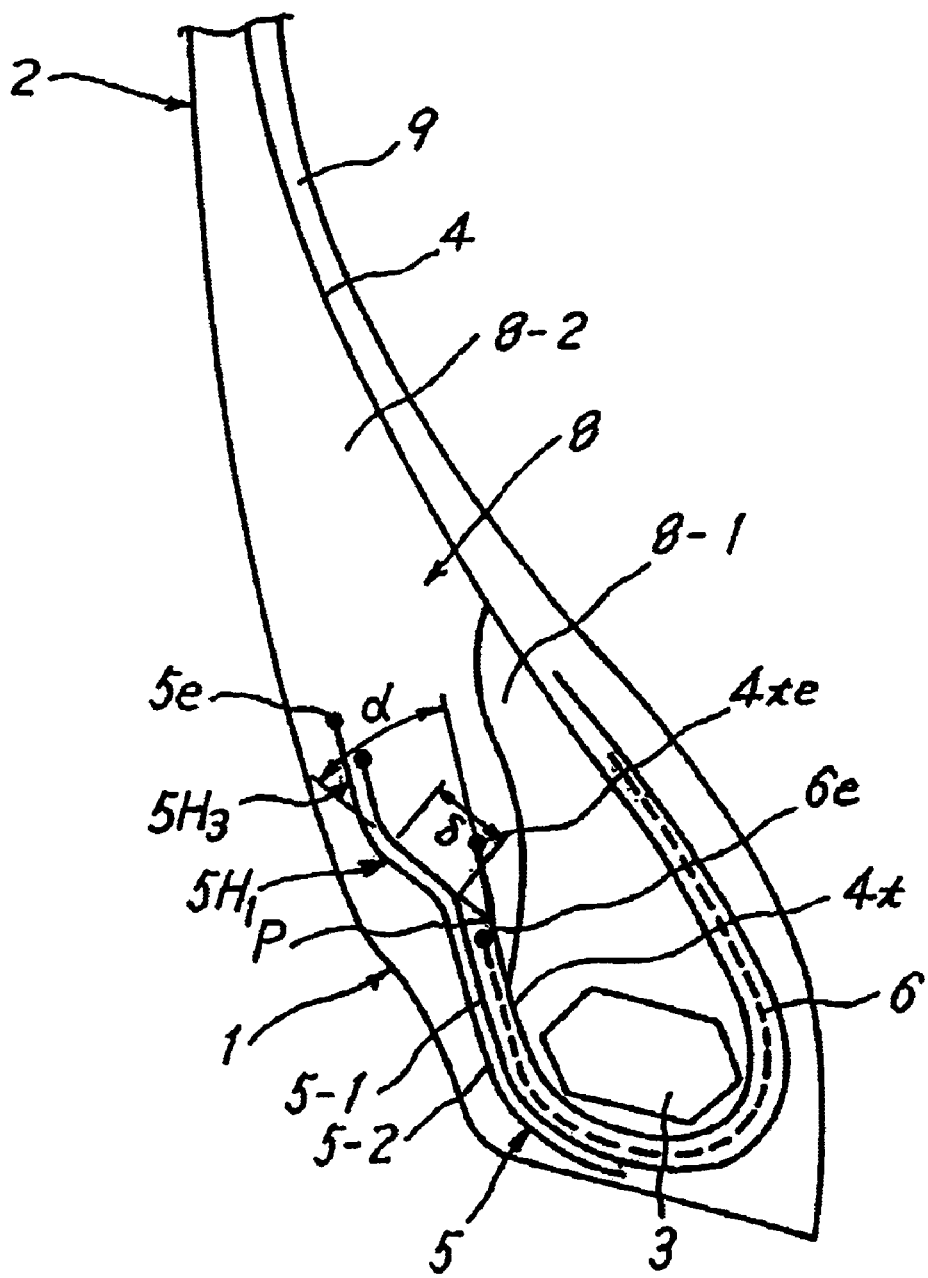

The organic fiber cord layer 5 in the bead portion 1 shown in FIG. 5 is an example wherein it locates outside the bead portion reinforcing layer 6 located outside the turnup portion 4t in the tire and has the first bent portion $5H_1$ and the third bent portion $5H_3$ together and terminates at an end 5e of the third bent portion $5H_3$.

Figure 6:
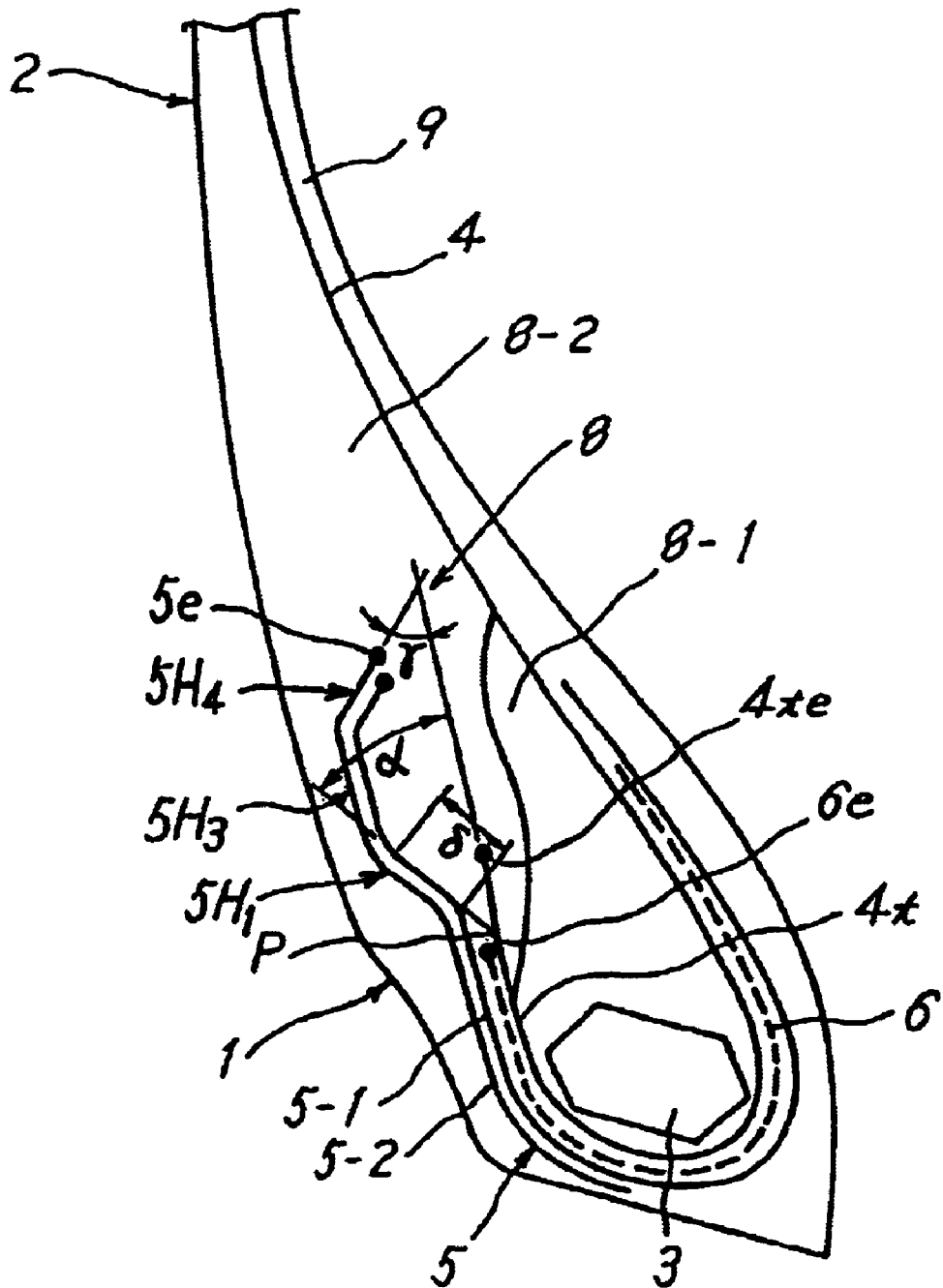

The organic fiber cord layer 5 shown in FIG. 6 is an example wherein it locates outside the bead portion reinforcing layer 6 located outside the turnup portion 4t in the tire and has the first bent portion $5H_1$, the third bent portion $5H_3$ and a fourth bent portion $5H_4$ extending from a bending end of the third bent portion $5H_3$ toward the inside of the tire and acutely inclining with respect to the winding direction of the turnup portion 4t together. The inclination angle $\gamma$ of the fourth bent portion $5H_4$ with respect to the winding direction of the turnup portion 4t is within a range of 15~60°.

The aforementioned bending angle $\alpha$ of the first bent portion $5H_1$, inclination angle $\beta$ of the second bent portion $5H_2$ and inclination angle $\gamma$ of the fourth bent portion $5H_4$ are defined as a cross angle between a tangent (hereinafter referred to as bent portion tangent) to a line (curved line or straight line or a composite line of curved line and straight line) passing through a center of a thickness in a central part of each bent portion other than a rounded bending position and a winding line at an intersect point P between the bent portion tangent and the winding line of the turnup portion 4t. Since there are existent plural or many bent portion tangents and winding lines, respectively, an average value of plural or many cross angles is used. Moreover, when the two organic fiber cord layers 5-1, 5-2 are used, or even in the case of three or more layers, all cord layers are put into the ranges of the above angles $\alpha$, $\beta$, $\gamma$. The angles $\alpha$, $\beta$, $\gamma$ are typically illustrated in one layer.

The tires according to the second aspect of the invention are explained in accordance with FIG. 7~FIG. 12. The bead portion 1 shown in FIG. 7~FIG. 12 has a structure that a bead portion reinforcing layer 6 (shown by dotted lines) made of a rubberized steel cord layer 6 is arranged adjacent to the outside of the turnup portion 4t and an end 6e of the reinforcing layer 6 is located outward from the end 4te of the turnup portion 4t in the radial direction and organic fiber cord layers 5 extending outward over the end 6e of the bead portion reinforcing layer 6 in the radial direction is arranged at the outside of the bead portion reinforcing layer 6 in the tire. In the bead portion 1 having such a structure, the organic fiber cord layers 5 are arranged directly near to the outside surface of the bead portion reinforcing layer 6 from the position separated apart within a range of 2~20 mm inward from the end 6e of the bead portion reinforcing layer 6 in the T/L tire in the radial direction. In this case, the end 4te of the turnup portion 4t is separated apart within a range of 5~60 mm inward from the end 6e of the bead portion reinforcing layer 6 in the radial direction.

As shown in FIG. 7~FIG. 12, the organic fiber cord layers 5 (5-1, 5-2) are arranged so as to extend from the position near to the outside of the bead core 3 or from the position separated apart within a range of the 2~20 mm inward from the end 6e of the bead portion reinforcing layer 6 in the T/L tire in the radial direction toward the outside of the tire and in a direction exceeding outward from the end 6e of the bead portion reinforcing layer 6 in the radial direction and to spread apart to the bead portion reinforcing layer 6. When a distance between a start position of spreading the organic fiber cord layer 5 to the bead portion reinforcing layer 6 and the end 6e of the reinforcing layer 6 is short, the organic fiber cord layers 5 are arranged spread apart to the bead portion reinforcing layer 6 and the extending direction of the reinforcing layer 6. The extending direction of the reinforcing layer 6 is described below.

In FIG. 7~FIG. 12, the organic fiber cord layers 5 extending from the bead portion reinforcing layer 6 so as to spread apart thereto have concretely a first bent portion $5H_1$ acutely bending outward from the position near to the outside of the bead core 3 in the radial direction and toward the outside of the tire with respect to the bead portion reinforcing layer 6 and the extending direction of the reinforcing layer 6. More concretely, the bending angle α of the first bent portion $5H_1$ with respect to the bead portion reinforcing layer 6 and the extending direction of the reinforcing layer 6 is within a range of 15~60° at a section of the tire shown in each figure. The term "extending direction of the bead portion reinforcing layer 6" used herein is defined by a tangent (hereinafter referred to as directing line) to a line (curved line or straight line or a composite curve of curved line and straight line) passing through a center of a thickness in an end portion inclusive of the end 6e of the bead portion reinforcing layer 6 at the section of the bead portion 1 or a portion ranging inward from the end 6e to a position separated apart therefrom within a range of 2~20 mm in the radial direction, which is the same as above. As to the organic fiber cord layer 5 having the first bent portion $5H_1$, there are existent various examples as mentioned below.

Figure 7:
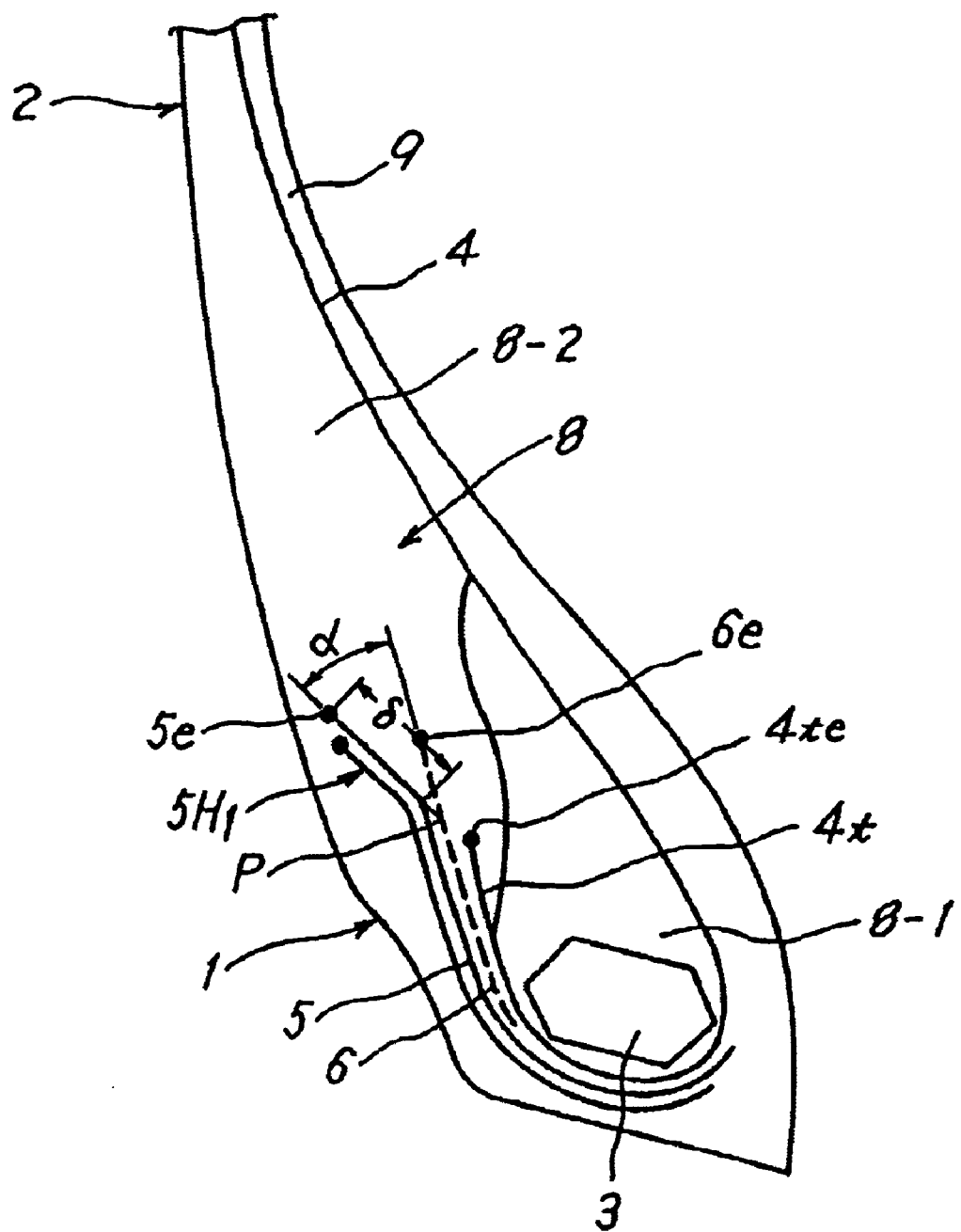
FIG. 7~FIG. 12 are diagrammatically sectional views of a main part inclusive of a bead portion at a section of a tire in a plane including a rotating axis of the heavy duty pneumatic radial tire according to the second aspect of the invention.
Figure 8:
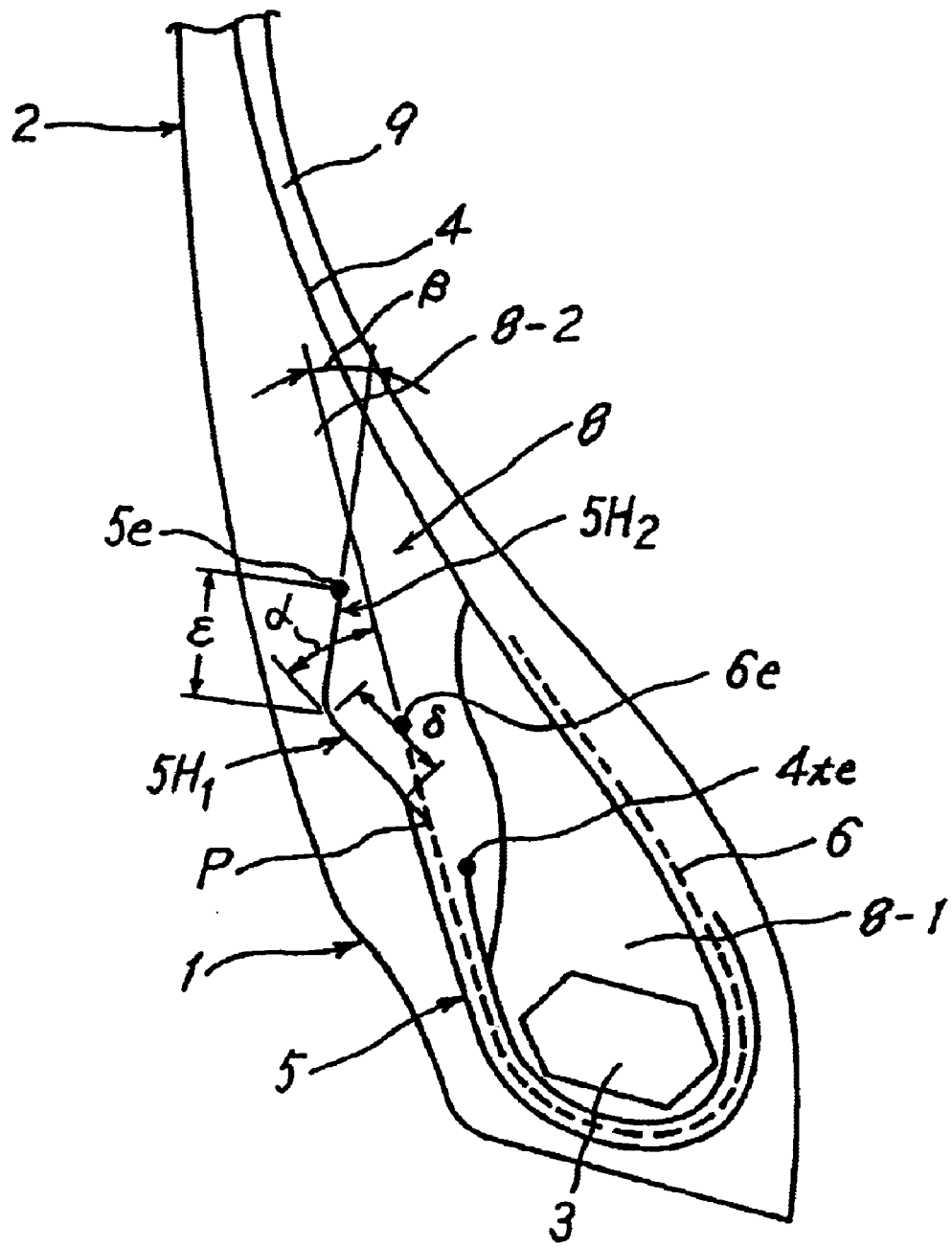

The organic fiber cord layer 5 shown in FIG. 7 is an example that the end 5e of the first bent portion $5H_1$ is an outermost end in the radial direction of the tire.

Figure 9:
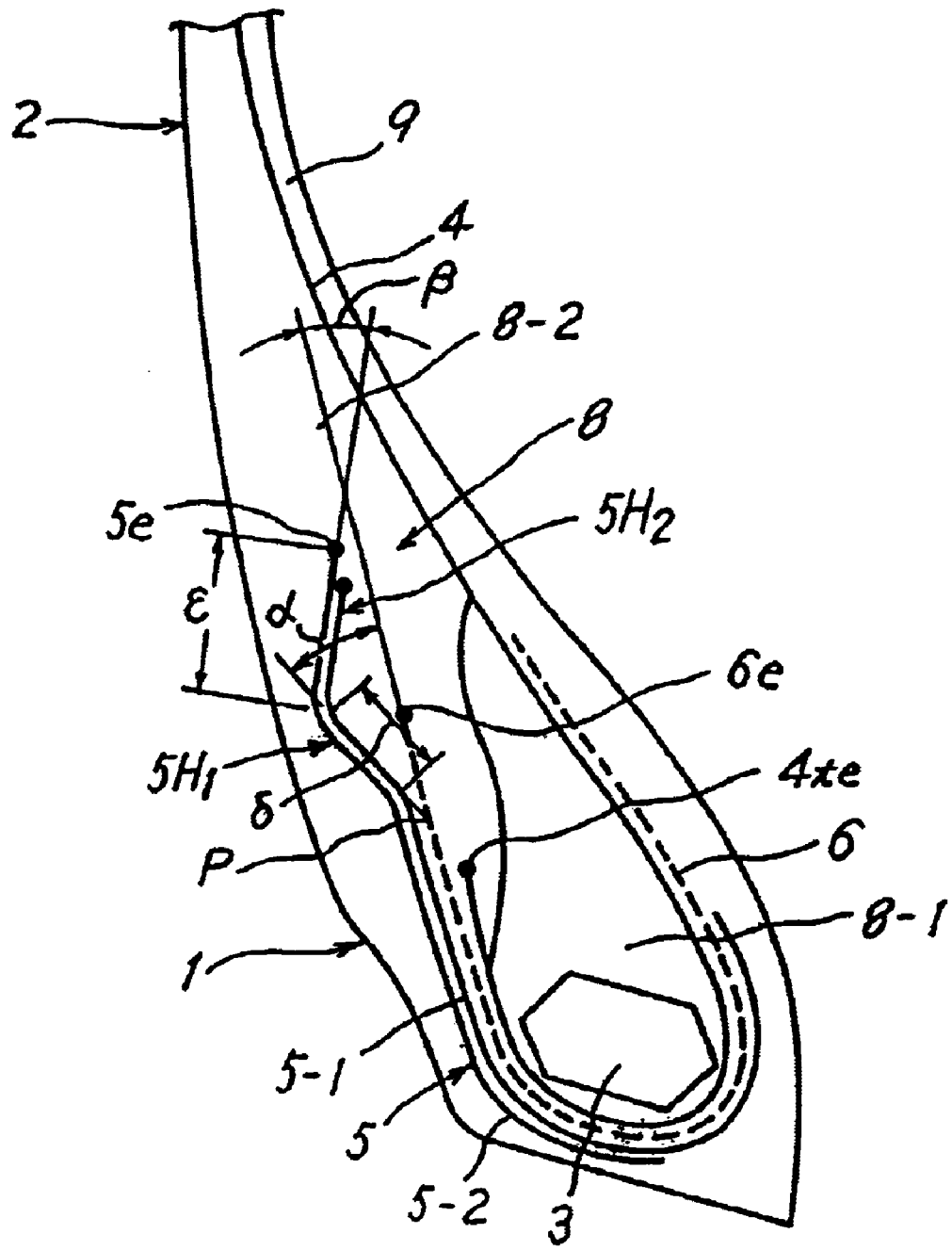

The organic fiber cord layer 5 shown in FIG. 8 and FIG. 9 is an example that the first bent portion $5H_1$ and a second bent portion $5H_2$ again bending toward the inside of the tire from an end at an outermost side position of the portion $5H_1$ are existent in a zone from the position near to the outside of the bead core 1 to the end 5e. As shown in FIG. 8, the second bent portion $5H_2$ is arranged so as to extend obliquely with respect to the extending direction of the bead portion reinforcing layer 6 and the inclination angle β thereof is within a range of 15~60°.

Figure 10:
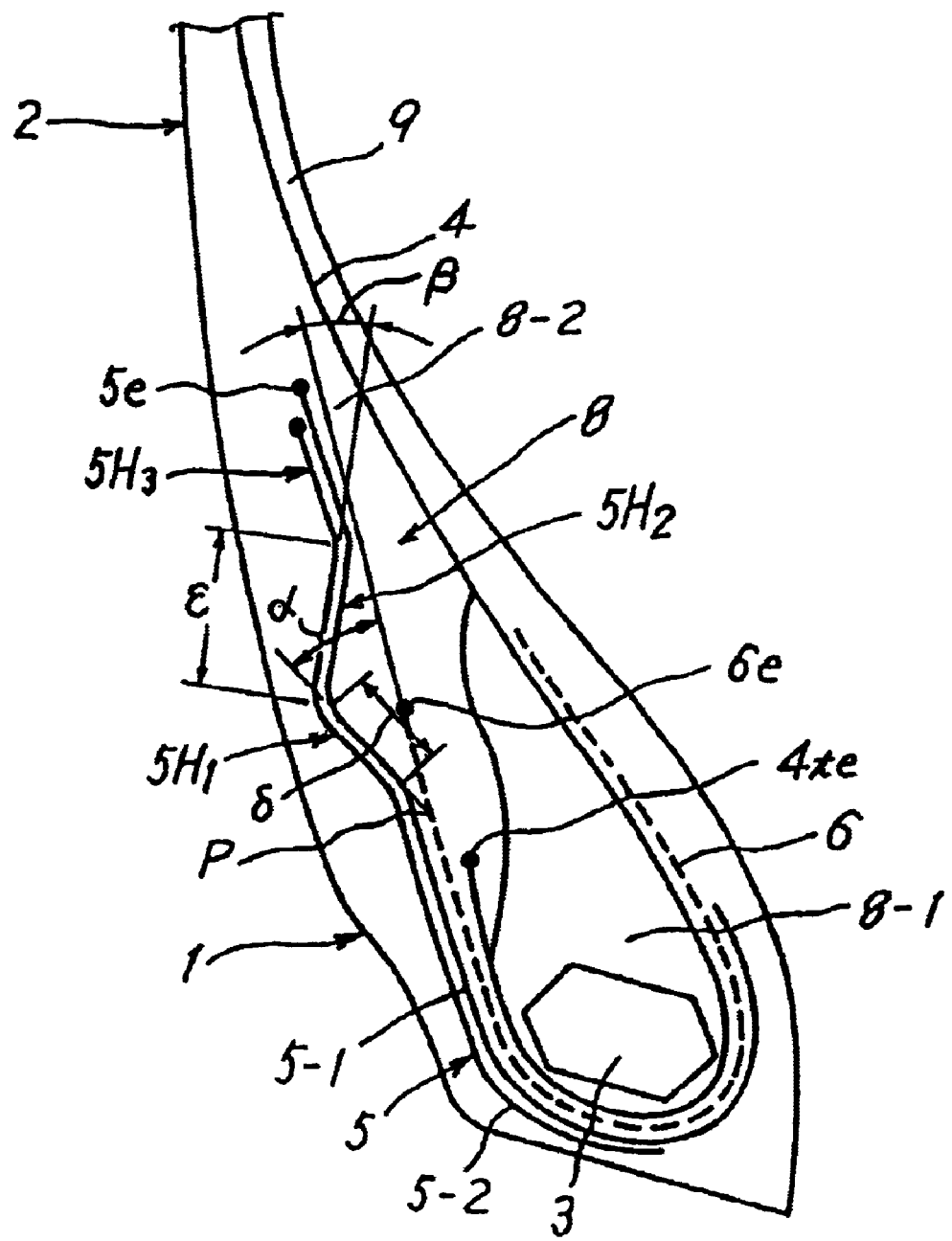

The organic fiber cord layer 5 shown in FIG. 10 is an example having the first bent portion $5H_1$, the second bent portion $5H_2$ and a third bent portion $5H_3$ extending outward from a bending end of the second bent portion $5H_2$ in the radial direction so as to maintain an approximately equal distance to the surface of the tire together, in which the third bent portion $5H_3$ has an end 5e.

Figure 11:
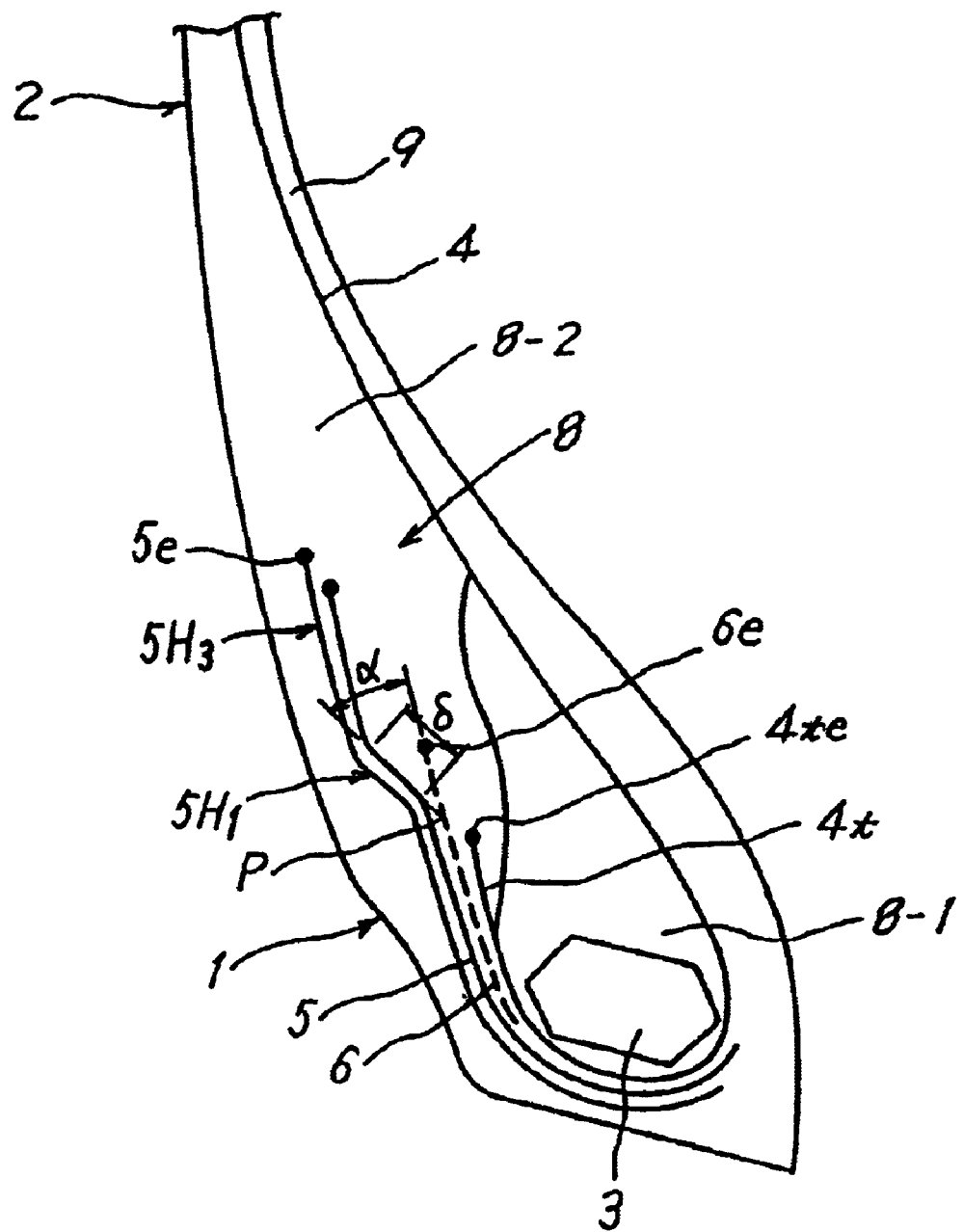

The organic fiber cord layer 5 shown in FIG. 11 is an example having the fist bent portion $5H_1$ and the third bent portion $5H_3$ extending outward from the bending end of the first bent portion $5H_1$ so as to maintain an approximately equal distance to the surface of the tire, in which the third bent portion $5H_3$ has an end 5e.

Figure 12:
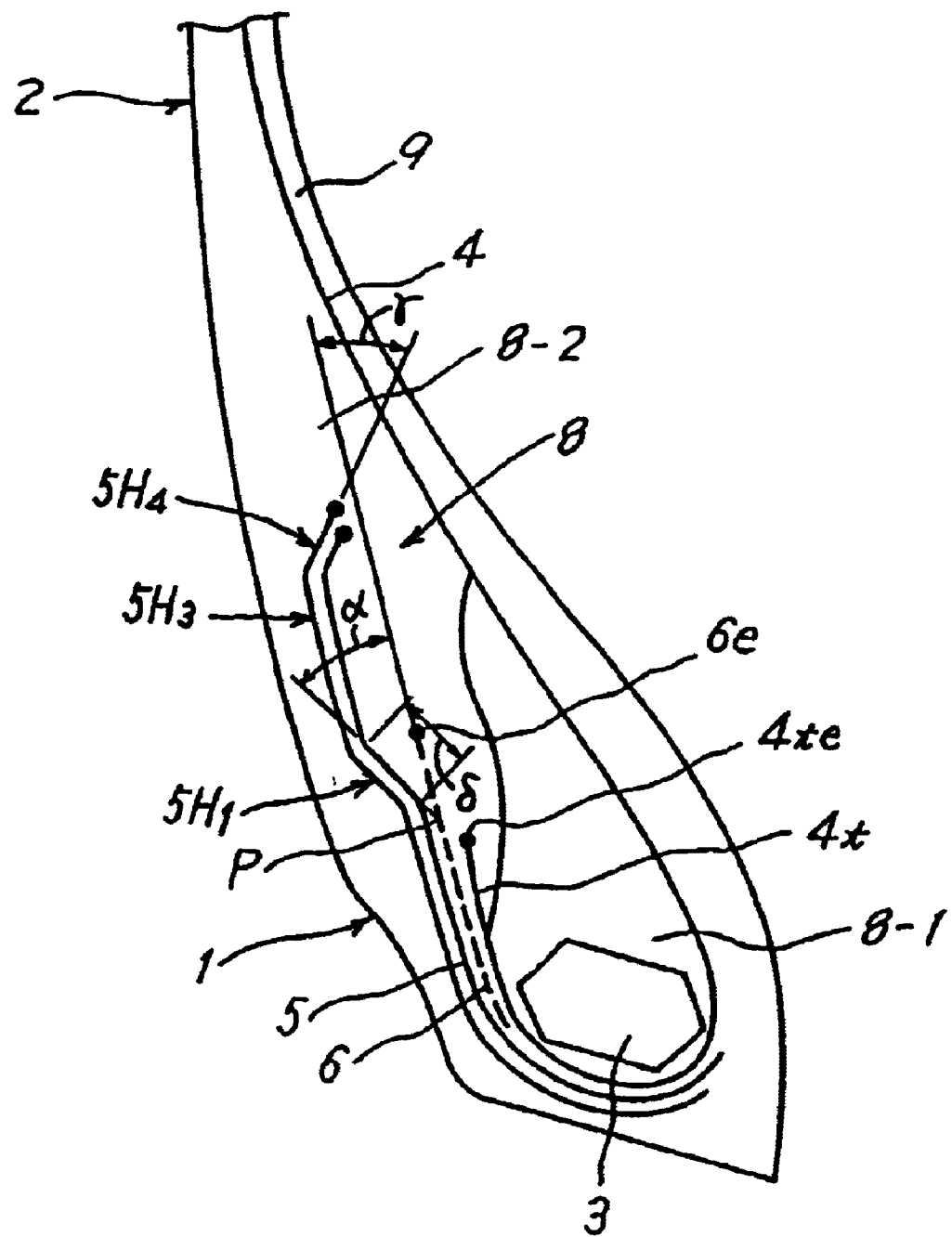

The organic fiber cord layer 5 shown in FIG. 12 is an example having the first bent portion $5H_1$, the third bent portion $5H_3$ and a fourth bent portion $5H_4$ extending from a bending end of the third bent portion $5H_3$ toward the inside of the tire and acutely inclining with respect to the extending direction of the bead portion reinforcing layer 6 together. The inclination angle γ of the fourth bent portion $5H_4$ with respect to the extending direction of the bead portion reinforcing layer 6 is within a range of 15~60°.

The aforementioned bending angle α of the first bent portion $5H_1$, inclination angle β of the second bent portion $5H_2$ and inclination angle γ of the fourth bent portion $5H_4$ are defined as a cross angle between a tangent (hereinafter referred to as bent portion tangent) to a line (curved line or straight line or a composite line of curved line and straight line) passing through a center of a thickness in a central part of each bent portion other than a rounded bending position and a directing line at an intersect point P between the bent portion tangent and the extending line of the bead portion reinforcing layer 6. Since there are existent plural or many bent portion tangents and directing lines, respectively, an average value of plural or many cross angles is used. Moreover, when the two organic fiber cord layers 5-1, 5-2 are used, or even in case of three or more layers, all cord layers are put into the ranges of the above angles α, β, γ. The angles α, β, γ are typically illustrated in one layer.

Referring to FIG. 19 previously mentioned, when the organic fiber cord layer 15 in the bead portion 1 corresponding to a ground contact region of a tread portion in the conventional tire rotating in an arrow direction under a load W is subjected to reaction force from road surface at the ground contact region, cords upward to the left $C_L$ are subjected to compression in their axial direction at a position corresponding to the leading edge of the contact patch to indicate a waving tendency as shown, while cords upward to the right $C_R$ are subjected to compression in their axial direction at a position corresponding to the trailing edge to indicate a waving tendency as shown, and both cords $C_L$, $C_R$ are subjected together to compression in the vicinity of a position jest under the load W (normal line of a rotating axis O of the tire shown in FIG. 19).

Figure 18:
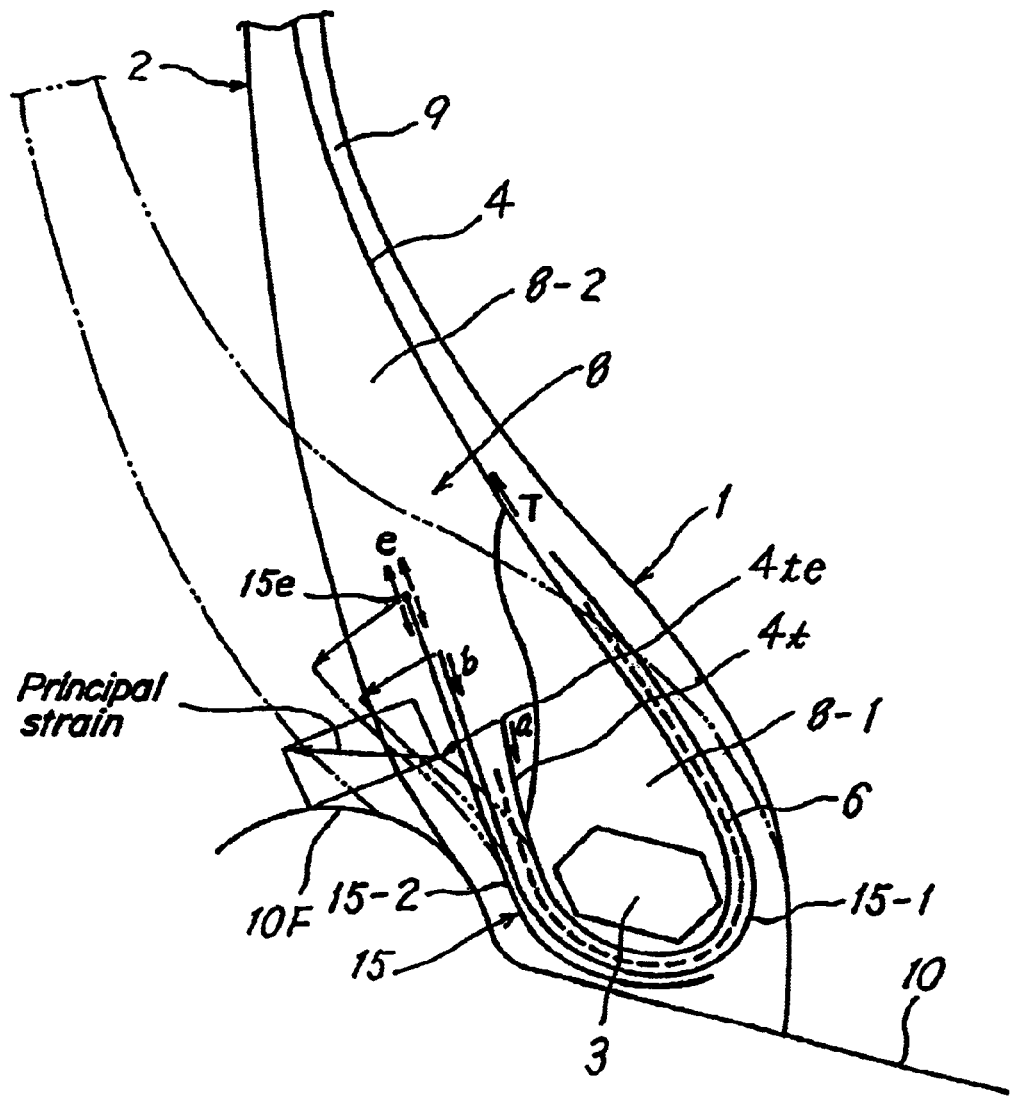

In FIG. 18 showing a left-side section of a main part of a tire-rim assembly when such a tire is assembled onto an approved rim 10, the bead portion 1~sidewall portion 2 under an inflation of a given air pressure are shown by a solid line, and each portion under a given load is shown by a phantom line, in which the bead portion shown by the phantom line is at a state of indicating so-called fall-down phenomenon. Such a fall-down can be grasped as a bending deformation just like the fixation of the bead portion 1 to a flange 10F of the rim and a bead seat of the rim.

This bending deformation results in a force directing from the sidewall portion 2 toward the bead portion 1, but it is difficult to avoid the action of such a force. On the assumption that the force is inevitable, considering a large triaxial strain produced in the vicinity of the end 4te of the turnup portion 4t having a high rigidity or in the vicinity of the ends of the bead portion reinforcing layers 6, 15 located higher than the end 4te, when a principal strain of rendering shear strain into zero and consisting of three-direction normal strains $\epsilon_1$, $\epsilon_2$, $\epsilon_3$ is taken as a plane problem for simplification, the principal strain shown in FIG. 18 has an inclination angle of about 45° with respect to the end 4te of the turnup portion 4t or the end 6e of the bead portion reinforcing layer 6 exceeding outward over the end 4te in the radial direction, and such an inclination angle is the same as the aforementioned bending angle α. The acting direction of the principal strain is an arrow direction in FIG. 18, or a direction toward the outside of the tire.

In the tire or T/L tire, therefore, the organic fiber cord layers 5 are arranged so as to extend from the position near to the outside of the bead core 3 or the position separated apart within a range of 2~20 mm inward from the end 4te of the turnup portion 4 in the radial direction over the end 4te of the turnup portion 4t toward the outside of the tire and outward in the radial direction, or from the position separated apart within a range of 2~20 mm inward from the end 6e of the bead portion reinforcing layer 6 exceeding the end 4te of the turnup portion 4t over the end 6e of the bead portion reinforcing layer 6 toward the outside of the tire and outward in the radial direction and spread apart to the turnup portion 4t or the bead portion reinforcing layer 6, or in other words, the spread organic fiber cord layers 5 is rendered into the first bent portion $5H_1$, whereby the arranging direction of the organic fiber cords in the first bent portion $5H_1$ of the organic fiber cord layer 5 can be matched to a tensile direction of the principal strain between the leading edge and the trailing edge of the contact patch during the rotation of the tire-rim assembly under loading to give tension to the organic fiber cords in the portion $5H_1$ and hence it is possible to increase the rigidity of the organic fiber cord layer 5 and improve the durability of the bead portion 1.

In fact, when the bending angle α of the first bent portion $5H_1$ is rendered into a range of 15~60°, preferably 20~40°, the tension can advantageously be applied to the organic fiber cords in the first bent portion $5H_1$.

Although only the compression force has been exclusively applied to the organic fiber cords in the vicinity of the end 4te of the turnup portion 4t and the outer end of the bead portion reinforcing layer 6 in the radial direction in the conventional tire, according to the invention, a tensile force offsetting the conventional compression force can be applied to the organic fiber cords in the first bent portion $5H_1$ of the organic fiber cord layer 5, whereby the rigidity of the organic fiber cord layer 5 can be more increased as compared with the conventional one to considerably enhance the stress mitigating effect at the end 4te of the turnup portion 4t and the end 6e of the bead portion reinforcing layer 6 and finally develop the effect of considerably improving the durability of the bead portion. Such effects are effective as a value of an aspect ratio in the tire (according to JATMA standard of 1998 print, NOMINAL ASPECT RATIO in TRA of 1998 print and ETRTO of 1998 print) becomes small. In this point, the invention is favorable to tires for trucks and buses having an aspect ratio of not more than 70.

And also, the feature that the bending length δ of the first bent portion $5H_1$ and the length ε of the second bent portion $5H_2$ are rendered into a range of 4~50 mm, respectively, effectively contributes to improve the rigidity of the organic fiber cord layer in the vicinity of the end 4te of the turnup portion 4t and outer end 6e of the bead portion reinforcing layer 6 in the radial direction. The bending length of the third bent portion $5H_3$ may be in the above range. Even in case of two or more organic fiber cord layers 5, each bending length of the bent portions $5H_1$, $5H_2$, $5H_3$ is within the above range.

Figure 13:
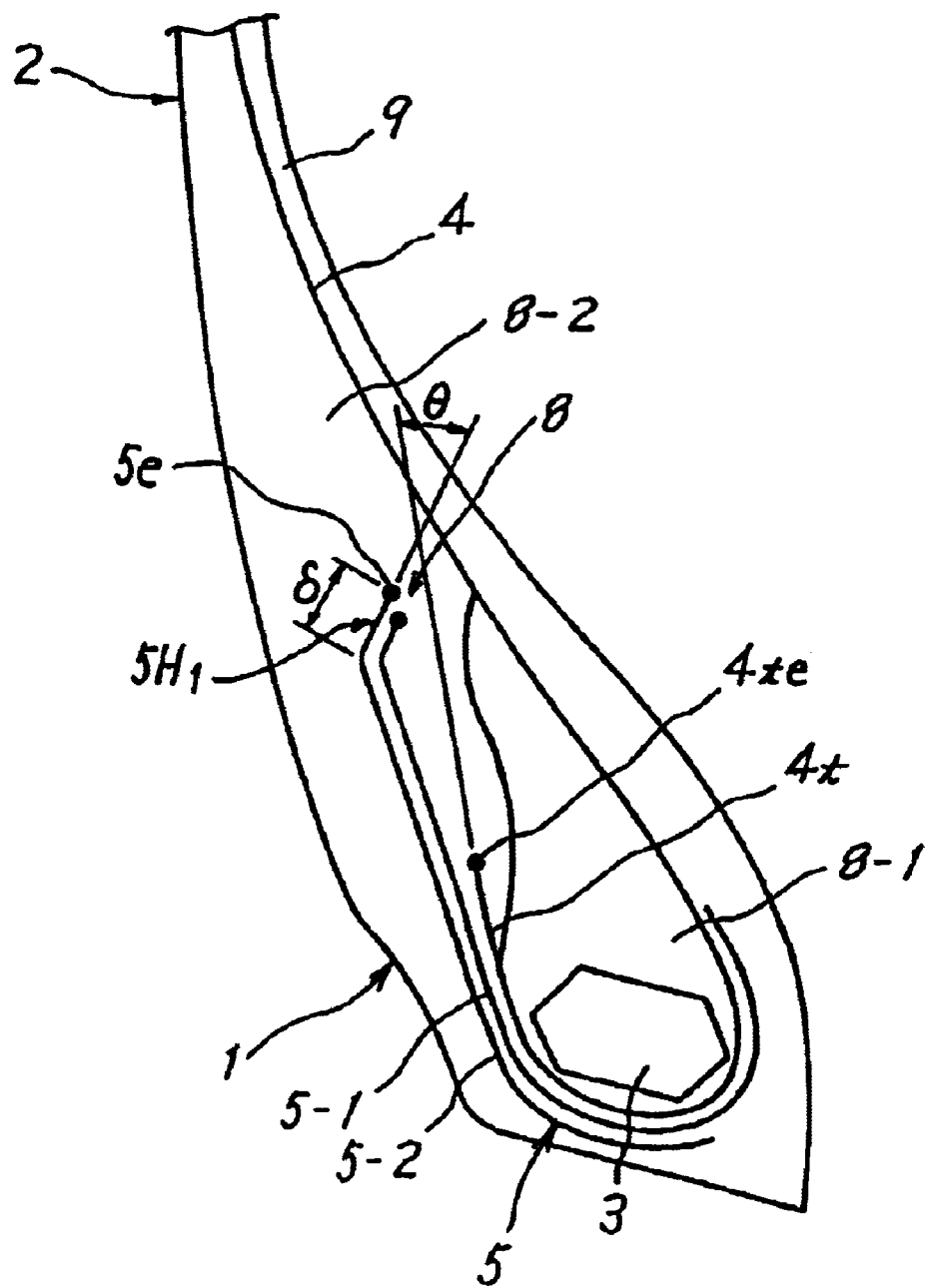
FIG. 13~FIG. 15 are diagrammatically sectional views of a main part inclusive of a bead portion at a section of a tire in a plane including a rotating axis of the heavy duty pneumatic radial tire according to the third aspect of the invention.
Figure 14:
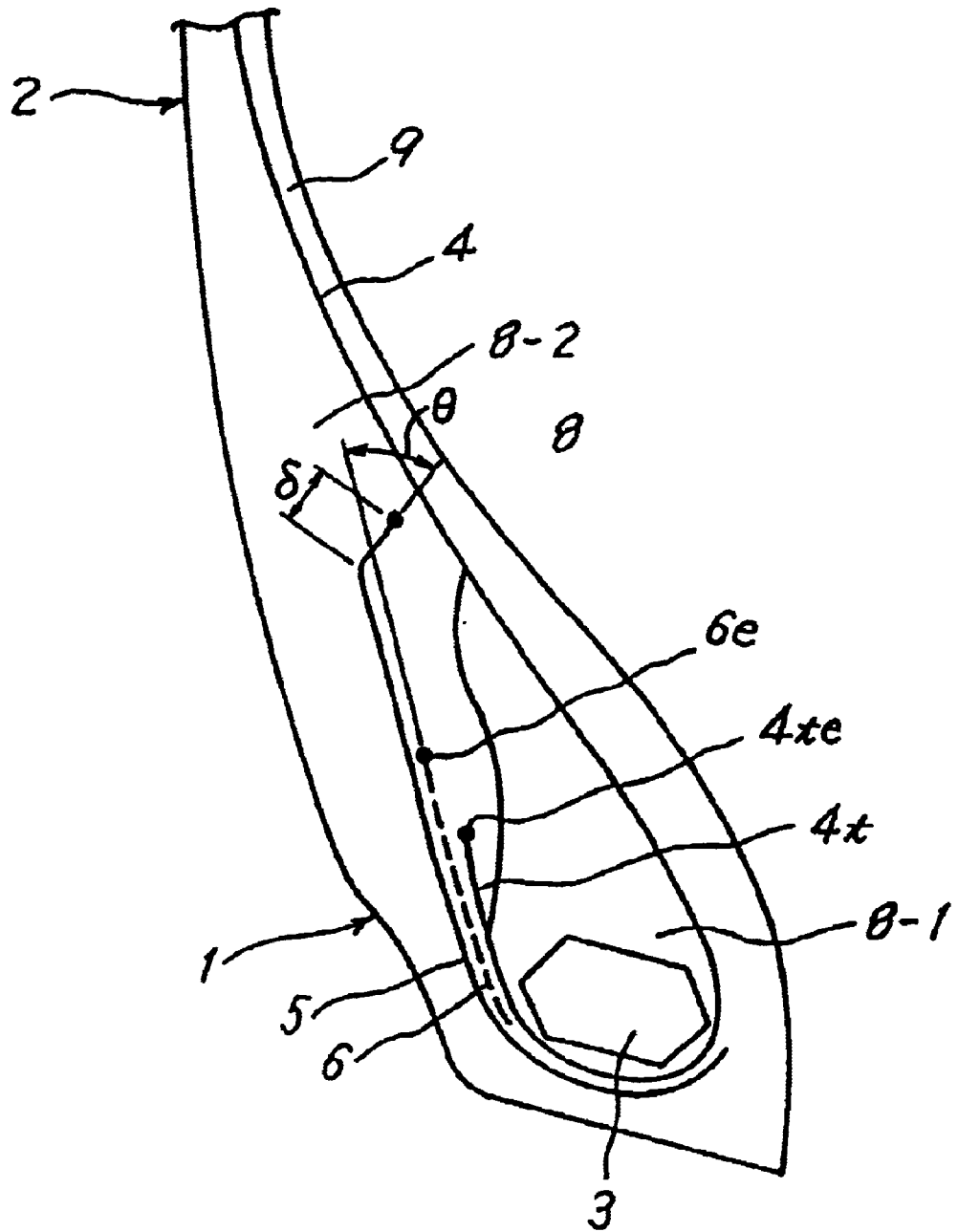

Finally, the tires according to the third aspect of the invention are explained in accordance with FIG. 13~FIG. 15. The bead portion 1 shown in FIG. 13 has a structure having organic fiber cord layers 5 arranged along the turnup portion 4t of the carcass 4, while the bead portion 1 shown in FIG. 14 and FIG. 15 has a structure that a bead portion reinforcing layer 6 (shown by dotted lines) is arranged adjacent to the turnup portion 4t and an end 6e of the reinforcing layer 6 is terminated outward from the end 4te of the turnup portion 4t in the radial direction and the organic fiber cord layers 5 are arranged at the outside of the turnup portion 4t so as to sandwich the bead portion reinforcing layer 6 therebetween. In all bead portions 1 shown in FIG. 13~FIG. 15, the organic fiber cord layer 5 at least located at the side of the turnup portion 4t has a first bent portion $5H_1$ bending an outer end 5e in the radial direction toward the inside of the tire. Further, the bending angle θ of the first bent portion 5H1 with respect to the winding direction of the turnup portion 4t is within a range of 15~70°, preferably 30~60°.

As mentioned above, the first bent portion $5H_1$ bending inward toward the inside of the tire at the outer end 5e in the radial direction is formed in the organic fiber cord layer 5, whereby compression strain unavoidably produced in the bead portion 1 during the rotation of the tire under loading may effectively be transmitted to the first bent portion $5H_1$ and hence a force off-setting the pulling force b applied to the end 15e of the organic fiber cord layer 15 in the conventional tire as previously mentioned in FIG. 18 is applied to the first bent portion $5H_1$ to finally decrease tensile strain in the end 5e of the first bent portion $5H_1$, whereby the occurrence of cracking in the end 5e can be controlled to improve the durability of the bead portion 1. In this case, the feature that the bending angle θ of the first bent portion $5H_1$ is within a range of 15~70°, desirably 30~60° is suitable for effective transmission of compression to the first bent portion $5H_1$.

The organic fiber cord layer 5 in the bead portion 1 shown in FIG. 13~FIG. 15 is an example that the end 5e of the first bent portion $5H_1$ is an outermost end in the radial direction of the tire. As the organic fiber cord layer 5 having the first bent portion $5H_1$, there are existent various examples as mentioned below.

The organic fiber cord layer 5 shown in FIG. 13 is an example that two organic fiber cord layers 5 (5-1, 5-2) are adjacent to the outside of the turnup portion 4t of the carcass 4 and have a first bent portion $5H_1$ bending toward the inside of the tire from a position separated apart in a range of 2~30 mm outward from the end 4te of the turnup portion 4t in the radial direction.

The organic fiber cord layer 5 shown in FIG. 14 and FIG. 15 is an example that a bead portion reinforcing layer 6 is adjacent to the outside of the turnup portion 4t and has an end 6e exceeding outward over the end 4te of the turnup portion 4t in the radial direction and the first bent portion $5H_1$ is at the outside of the reinforcing layer 6 and bends toward the inside of the tire at a position separated apart within a range of 2~30 mm outward from the end 6e of the reinforcing layer. Moreover, a case that the end 6e of the reinforcing layer 6 located inward from the end 4te of the turnup portion 4t in the radial direction is included though the illustration is omitted.

And also, the feature that the length of the first bent portion $5H_1$ shown in FIG. 13~FIG. 15 is within a range of 4~50 mm is suitable for the effective transmission of compression to the end 5e of the first bent portion $5H_1$.

Moreover, numeral 8 shown in FIG. 1~FIG. 18 is a stiffener. The stiffener 8 has a tapered hard rubber stiffener 8-1 arranged at the side of the bead core 3 and a soft rubber stiffener 8-2 extending adjacent thereto outward in the radial direction. The inner surface of the tire is covered with an innerliner 9, which particularly uses an air impermeable rubber in the T/L tire. It is favorable that the outer end 5e of the first bent portion $5H_1$ bending toward the inside of the tire is terminated in the inside of the soft rubber stiffener 8-2.

There are provided T/L radial tires for trucks and buses having a size of 11/70R22.5, in which a carcass 4 is a single rubberized steel cord ply of radial arrangement and a belt is comprised of four rubberized steel cord cross layers. An organic fiber cord layer 5 is a nylon chafer containing nylon cords of 1260D/2 at an end count of 31.0 cords/5 cm, and a bead portion reinforcing layer 6 is a wire chafer having steel cords of 3×0.24+9×0.225+1 structure at an end count of 23.5 cords/5 cm. A height of an end 4te of a turnup portion 4t of the carcass 4 from a bead base line (a straight line passing through an intersect between an extension line of the bead base and an extension line of a section of a bead portion at the side of a flange 10F of a rim 10 and parallel to a rotating axis of the tire with reference to FIG. 18) is 45 mm.

They are divided into a first group of Examples 1~9 and conventional example having a structure of a bead portion 1 as shown in FIG. 1~FIG. 6 according to the first aspect of the invention, a second group of Examples 10~17 and conventional example having a structure of a bead portion 1 as shown in FIG. 7~FIG. 12 according to the second aspect of the invention, and a third group of Examples 18~23 and conventional example having a structure of a bead portion as shown in FIG. 13~FIG. 15 according to the third aspect of the invention. The bending angle α (degree) and bending angle θ (degree) of the first bent portion $5H_1$, inclination angle β (degree) of the second bent portion $5H_2$, inclination angle γ (degree) of the fourth bent portion $5H_4$, length δ (mm) of the first bent portion $5H_1$ and bending length ε (mm) of the second bent portion $5H_2$ are shown in Table 1 as the first group, Table 2 as the second group and Table 3 as the third group together with the corresponding figure No., respectively. Moreover, the conventional example has a bead portion structure common to each group.

kgf until troubles, mainly separation failure are caused in the bead portion 1. The running distance till the occurrence of the trouble is represented by an index on the basis that the conventional example is 100. The larger the index value, the better the property. The index value of the running distance of each tire is shown in a lower column of Tables 1, 2, and 3.

The test for the crack resistance is a durability test in a long-period test inclusive of recapping according to a test method called a long run test, in which the tire is run on the same drum as mentioned above at a speed of 60 km/h under a load of 4080 kgf over 100,000 km and thereafter the tire is taken out therefrom and cut to measure a crack length in ends 5e, 15e of the organic fiber cord layers 5, 15. A crack rate is calculated by dividing the crack length by the

TABLE 1

| Items | Conventional Example | Examples | | | | | | | | |
|---|---|---|---|---|---|---|---|---|---|---|
| | | 1 | 2 | 3 | 4 | 5 | 6 | 7 | 8 | 9 |
| FIG. No. | 18 | 1 | 2 | 2 | 2 | 2 | 3 | 4 | 5 | 6 |
| Bending angle α (°) | 0 | 18 | 13 | 65 | 20 | 33 | 48 | 35 | 30 | 55 |
| Inclination angle β (°) | 0 | — | 25 | 65 | 55 | 50 | 45 | — | — | 35 |
| Inclination angle γ (°) | 0 | — | — | — | — | — | — | — | — | 38 |
| Length δ (mm) | 10 | 15 | 10 | 10 | 6 | 12 | 6 | 13 | 8 | 6 |
| Length ε (mm) | 0 | — | 10 | 10 | 15 | 4 | 15 | — | — | 15 |
| Running distance (index) | 100 | 115 | 103 | 102 | 120 | 127 | 125 | 130 | 123 | 115 |
| Cracking rate (index) | 100 | 103 | 98 | 98 | 72 | 77 | 95 | 100 | 100 | 80 |

TABLE 2

| Items | Conventional Example | Examples | | | | | | | |
|---|---|---|---|---|---|---|---|---|---|
| | | 10 | 11 | 12 | 13 | 14 | 15 | 16 | 17 |
| FIG. No. | 18 | 7 | 8 | 9 | 9 | 9 | 10 | 11 | 12 |
| Inclination angle α (°) | 0 | 21 | 38 | 13 | 65 | 23 | 35 | 30 | 50 |
| Inclination angle β (°) | 0 | — | 52 | 18 | 72 | 50 | 35 | — | 35 |
| Inclination angle γ (°) | 0 | — | — | — | — | — | — | — | 38 |
| Length δ (mm) | 0 | 13 | 10 | 10 | 10 | 15 | 15 | 18 | 15 |
| Length ε (mm) | 0 | — | 30 | 10 | 10 | 20 | 20 | — | 20 |
| Running distance (index) | 100 | 120 | 127 | 103 | 102 | 124 | 130 | 125 | 120 |
| Cracking rate (index) | 100 | 103 | 76 | 98 | 98 | 72 | 95 | 98 | 85 |

TABLE 3

| Items | Conventional Example | Examples | | | | | |
|---|---|---|---|---|---|---|---|
| | | 18 | 19 | 20 | 21 | 22 | 23 |
| FIG. No. | 18 | 13 | 13 | 13 | 13 | 14 | 15 |
| Inclination angle θ (°) | 0 | 55 | 50 | 20 | 67 | 40 | 45 |
| Length δ (mm) | 0 | 30 | 15 | 5 | 20 | 10 | 15 |
| Running distance (index) | 100 | 100 | 100 | 100 | 100 | 100 | 100 |
| Cracking rate (index) | 100 | 70 | 75 | 90 | 87 | 80 | 75 |

With respect to each tire of Examples 1~23 and conventional examples as a test tire, a test for bead portion durability and a test for crack resistance are carried out under the following conditions after the tire is mounted the tire onto an acceptable rim of 7.50×22.5 among the approved rims defined according to JATMA standard (JATMA YEAR BOOK, 1998) and a maximum air pressure of 8.5 kgf/cm² corresponding to a maximum loading capacity (SINGLE: 2720 kg, DUAL: 2500 kg) defined according to JATMA standard is applied to the tire-rim assembly.

In the durability test, the tire is run on a drum of 1.7 m in diameter at a speed of 60 km/h under a heavy load of 5000 running distance of 100,000 km and represented by an index on the basis that the crack rate of the conventional example is 100. The smaller the index value, the better the property. The crack rate index of each tire is shown in the lowest column of Tables 1, 2 and 3.

In general, as seen from the results of Tables 1 and 2, all of the example tires generally develop an excellent bead portion durability as to the reinforcement and strengthening of the bead portion because the running distance in all example tires exceeds the running distance of the conventional example under a heaviest load, while as seen from the results of Table 3, all of the example tires show a bead portion durability equal to that of the tire of the conventional example under use condition of a heavy load and develop an excellent crack resistance under a long-period use condition inclusive of recapping, and hence the bead portion durability in the long-period use is improved based on such an improvement of the crack resistance.

As the results of Tables 1 and 2 are examined in detail, each tire of Examples 1~7 not using the wire chafer 6 effective as a bead portion reinforcing layer show a durability exceeding the running distance of the conventional tire, and also the each tire of Examples 1~7 (former) is run over a distance equal to those of the tires of Examples 8~10, 12~17 (latter) using the same two nylon chafers 5 and single wire chafer 6 as in the conventional example. The former can simultaneously attain both weight reduction and improvement of bead portion durability, while the latter can attain the remarkable improvement of the bead portion durability under the same weight and structure.

As seen from the above test results, when the organic fiber cord layer 5 has a first bent portion $5H_1$ spread apart to the turnup portion 4t or the bead portion reinforcing layer 6 therealong toward the outside of the tire and the first bent portion $5H_1$ has a proper range of a bending angle $\alpha$, the organic fiber cord layer 5 develops an effective rigidity as expected and sufficiently serves to mitigate stress in the end 4te of the turnup portion 4t or the end 6e of the wire chafer 6.

Then, when the organic fiber cord layer 5 has a first bent portion $5H_1$ bending toward the inside of the tire to the turnup portion 4t or the bead portion reinforcing layer 6 therealong and the first bent portion $5H_1$ has a proper range of a bending angle $\theta$, the crack resistance in the end 5e of the organic fiber cord layer 5 is improved and hence the durability of the organic fiber cord layer 5 itself is largely improved.

According to the invention, the rigidity in a portion of the organic fiber cord layer covering either one of an end of the turnup portion of the carcass and an end of the wire chafer extending outward over the turnup end in the radial direction of the tire as a bead portion reinforcing layer can considerably be increased, whereby it is possible to effectively mitigate stress applied to the ends during the rotation of the tire under loading with the portion of the organic fiber cord layer having the high rigidity. Also, it is possible to advantageously improve the crack resistance in the end of the organic fiber cord layer. As a result, there can be provided a heavy duty pneumatic radial tire capable of considerably improving the bead portion durability as compared with that of the conventional tire.

What is claimed is:

1. A heavy duty pneumatic radial tire comprising a carcass of at least one rubberized cord ply of radial arrangement toroidally extending between a pair of bead cores embedded in bead portions and wound around the bead core from inside of the tire toward outside to form a turnup portion, and at least one rubberized organic fiber cord layer extending outside the turnup portion over an end of the turnup portion outward in a radial direction of the tire, in which at least a cord layer portion of the organic fiber cord layer located at the side of the turnup portion has a first bent portion bending such that its outer end is inclined toward an inside of the tire in a radial direction thereof.

2. A tire according to claim 1, wherein a bending angle ($\theta$) of the first bent portion with respect to the winding direction of the turnup portion is within a range of 15–70° at the section of the tire.

3. A tire according to claim 1, wherein a bead portion reinforcing layer made of a rubberized steel cord layer is disposed between the turnup portion of the carcass and the organic fiber cord layer, and an outer end of the reinforcing layer in the radial direction of the tire locates inward from an end of the turnup portion in the radial direction of the tire.

4. A tire according to claim 1, wherein a bead portion reinforcing layer made of a rubberized steel cord layer is disposed between the turnup portion of the carcass and the organic fiber cord layer, and an outer end of the reinforcing layer in the radial direction of the tire locates between and end of the turnup portion and an outer end of at least cord layer portion of the organic fiber cord layer located at the side of the turnup portion of the carcass, and the first bent portion locates outward from the outer end of the bead portion reinforcing layer in the radial direction of the tire.

5. A tire according to claim 1, wherein the end of the first bent portion of the organic fiber cord layer is an outermost end in the radial direction of the tire.

\* \* \* \* \*